(12) United States Patent
Miyazaki

(10) Patent No.: US 9,046,849 B2
(45) Date of Patent: Jun. 2, 2015

(54) INFORMATION PROCESSING APPARATUS, INFORMATION PROCESSING SYSTEM, AND DISPLAY METHOD

(71) Applicant: Ryonosuke Miyazaki, Tokyo (JP)

(72) Inventor: Ryonosuke Miyazaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/451,596

(22) Filed: Aug. 5, 2014

(65) Prior Publication Data

US 2014/0341601 A1      Nov. 20, 2014

Related U.S. Application Data

(63) Continuation of application No. 13/804,597, filed on Mar. 14, 2013, now Pat. No. 8,837,000.

(30) Foreign Application Priority Data

Mar. 22, 2012   (JP) ................. 2012-066407

(51) Int. Cl.
| | |
|---|---|
| G03G 15/00 | (2006.01) |
| G03G 15/22 | (2006.01) |
| G03G 15/01 | (2006.01) |
| H04N 1/54 | (2006.01) |
| G06K 15/02 | (2006.01) |

(Continued)

(52) U.S. Cl.
CPC .......... *G03G 15/5054* (2013.01); *G03G 15/224* (2013.01); *G03G 15/502* (2013.01); *G03G 15/5025* (2013.01); *G03G 15/6585* (2013.01); *G03G 15/01* (2013.01); *H04N 1/54* (2013.01); *G06K 15/18* (2013.01); *H04N 1/00* (2013.01); *H04N 1/46* (2013.01); *G03G 2215/00059* (2013.01)

(58) Field of Classification Search
CPC ............ G03G 15/6585; G03G 15/502; G03G 2215/00805; G03G 2215/0081; H04N 1/54; G06K 15/02
USPC ............ 358/2.1, 1.9, 1.1, 1.2; 399/53, 67, 69, 399/231, 341
See application file for complete search history.

(56) References Cited

U.S. PATENT DOCUMENTS

| | | | |
|---|---|---|---|
| 7,940,425 B2 | 5/2011 | Ohta et al. | |
| 8,190,076 B2 | 5/2012 | Omata | |

(Continued)

FOREIGN PATENT DOCUMENTS

| | | |
|---|---|---|
| JP | 2009-265405 | 11/2009 |
| JP | 2011-141405 | 7/2011 |

(Continued)

*Primary Examiner* — Charlotte M Baker
(74) *Attorney, Agent, or Firm* — Cooper & Dunham LLP

(57) ABSTRACT

An information processing apparatus includes: a total amount control unit that applies a total amount controlling process to perform correction such that a sum of density values of all pixels composing the color plane data and clear plane data becomes not larger than a certain value; a clear toner plane generating unit that generates clear toner plane data based on gloss control plane data, the clear plane data and the color plane data; a difference calculating unit that calculates a difference between the density value of a pixel of the clear toner plane data and the density value of the pixel of the clear toner plane data to which the total amount controlling process is applied, for each pixel; and a display unit that displays an inconsistent region composed of a pixel in which the difference is not smaller than a predetermined threshold.

10 Claims, 25 Drawing Sheets

(51) Int. Cl.
*H04N 1/00* (2006.01)
*H04N 1/46* (2006.01)

(56) References Cited

U.S. PATENT DOCUMENTS

| | | |
|---|---|---|
| 8,373,896 B2 | 2/2013 | Tsutsumi |
| 8,705,127 B2 | 4/2014 | Koyatsu et al. |
| 8,711,427 B2 | 4/2014 | Tokushima et al. |
| 8,837,000 B2 * | 9/2014 | Miyazaki ................ 358/2.1 |

| | | |
|---|---|---|
| 2009/0268216 A1 | 10/2009 | Iinuma |
| 2011/0267654 A1 | 11/2011 | Matsunaga |
| 2012/0062956 A1 | 3/2012 | Kitagawa et al. |
| 2012/0063802 A1 | 3/2012 | Suzuki et al. |
| 2012/0237243 A1 | 9/2012 | Yamamoto et al. |
| 2012/0237245 A1 | 9/2012 | Mitsui et al. |

FOREIGN PATENT DOCUMENTS

| | | |
|---|---|---|
| JP | 2012-83736 | 4/2012 |
| JP | 2012-84135 | 4/2012 |

* cited by examiner

IMAGE DATA OF COLOR PLANE

| NAME OF GLOSS CONTROL | GLOSS | DEVIATION |
|---|---|---|
| SPECULAR GLOSS (PG) | Gs ≥ 80 | ΔGs ≤ 10 |
| SOLID GLOSS (G) | Gs = Gs (SOLID GLOSS) | ΔGs ≤ 10 |
| HALFTONE-DOT MATT (M) | Gs = Gs (1C30% HALFTONE-DOT) | ΔGs ≤ 10 |
| MATT (PM) | Gs ≤ 10 | ΔGs ≤ 10 |

IMAGE DATA OF GLOSS CONTROL PLANE

▨ :REGION IN WHICH PG IS SPECIFIED (DENSITY VALUE 98%)

▧ :REGION IN WHICH G IS SPECIFIED (DENSITY VALUE 90%)

☰ :REGION IN WHICH M IS SPECIFIED (DENSITY VALUE 16%)

IMAGE DATA OF CLEAR PLANE

| TYPE OF SURFACE EFFECT SPECIFIED BY USER | DENSITY VALUE (%) OF GLOSS CONTROL PLANE |
|---|---|
| PG | 98% |
| G | 90% |
| M | 16% |
| PM | 6% |

| DRAWING OBJECT | COORDINATE | DENSITY VALUE |
|---|---|---|
| A, B, C | (x1, y1) - (x2, y2) | 98% |
| (SQUARE) | (x3, y3) - (x4, y4) | 90% |
| ... | ... | ... |

FIG.11

| DENSITY (%) | DENSITY REPRESENTATIVE VALUE | VALUE RANGE | | EFFECT | GLOSSER ON/OFF (ON/OFF INFORMATION) | CLEAR TONER PLANE 1 (PRINTER) | CLEAR TONER PLANE 2 (LOW-TEMPERATURE FIXING UNIT) |
|---|---|---|---|---|---|---|---|
| 98% | 250 | 248 | 255 | SPECULAR GLOSS TYPE A | ON | INVERSE MASK A | no data |
| 96% | 245 | 243 | 247 | SPECULAR GLOSS TYPE B | ON | INVERSE MASK B | no data |
| 94% | 240 | 238 | 242 | SPECULAR GLOSS TYPE C | ON | INVERSE MASK C | no data |
| 92% | 235 | 233 | 237 | RESERVED | | | |
| 90% | 230 | 228 | 232 | SOLID GLOSS TYPE 1 | OFF | INVERSE MASK 1 | no data |
| 88% | 224 | 222 | 227 | SOLID GLOSS TYPE 2 | OFF | INVERSE MASK 2 | no data |
| 86% | 219 | 217 | 221 | SOLID GLOSS TYPE 3 | OFF | INVERSE MASK 3 | no data |
| 84% | 214 | 212 | 216 | SOLID GLOSS TYPE 4 | OFF | INVERSE MASK 4 | no data |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | no data | TILE CHARACTER STRING 3 |
| 42% | 107 | 105 | 109 | WATERMARK CHARACTER 2 (COPYING IS STRICTLY PROHIBITED) | | no data | TILE CHARACTER STRING 2 |
| 40% | 102 | 100 | 104 | WATERMARK CHARACTER 1 (SAMPLE) | | no data | TILE CHARACTER STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | no data | TILE BACKGROUND PATTERN 3 |
| 32% | 82 | 80 | 84 | BACKGROUND PATTERN 2 (LATTICE) | | no data | TILE BACKGROUND PATTERN 2 |
| 30% | 76 | 74 | 79 | BACKGROUND PATTERN 1 (WAVE) | | no data | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TACTILE PATTERN TYPE 3 (ROUGH) | | no data | TILE NET PATTERN 3 |
| 22% | 56 | 54 | 58 | TACTILE PATTERN TYPE 2 (MIDDLE) | | no data | TILE NET PATTERN 2 |
| 20% | 51 | 49 | 53 | TACTILE PATTERN TYPE 1 (FINE) | | no data | TILE NET PATTERN 1 |
| 18% | 46 | 44 | 48 | RESERVED | | | |
| 16% | 41 | 39 | 43 | HALFTONE-DOT MATT TYPE 4 | OFF | HALFTONE 4 | no data |
| 14% | 36 | 34 | 38 | HALFTONE-DOT MATT TYPE 3 | OFF | HALFTONE 3 | no data |
| 12% | 31 | 29 | 33 | HALFTONE-DOT MATT TYPE 2 | OFF | HALFTONE 2 | no data |
| 10% | 25 | 23 | 28 | HALFTONE-DOT MATT TYPE 1 | OFF | HALFTONE 1 | no data |
| 8% | 20 | 18 | 22 | RESERVED | | | |
| 6% | 15 | 13 | 17 | MATT TYPE C | ON&OFF | no data | SOLID |
| 4% | 10 | 8 | 12 | MATT TYPE B | ON&OFF | no data | SOLID |
| 2% | 5 | 1 | 7 | MATT TYPE A | ON&OFF | no data | SOLID |
| 0% | 0 | 0 | 0 | NONE | OFF | no data | no data |

FIG.21

DIFFERENCE INFORMATION TABLE

| PIXEL POSITION | SURFACE EFFECT | DENSITY VALUE | DENSITY DIFFERENCE (DIFFERENCE) |
|---|---|---|---|
| (x1, y1) | GLOSS CONTROL PLANE | 2% | 10 |
| (x2, y2) | GLOSS CONTROL PLANE | 2% | 8 |
| (x3, y3) | CLEAR PLANE | 3% | 5 |
| ... | ... | ... | ... |

INFORMATION PROCESSING APPARATUS, INFORMATION PROCESSING SYSTEM, AND DISPLAY METHOD

CROSS-REFERENCE TO RELATED APPLICATIONS

The present application claims priority to and incorporates by reference the entire contents of Japanese Patent Application No. 2012-066407 filed in Japan on Mar. 22, 2012.

BACKGROUND OF THE INVENTION

1. Field of the Invention

The present invention relates to an information processing apparatus, an information processing system, and a display method.

2. Description of the Related Art

There is a conventional image forming device equipped with a clear toner, which is a colorless toner without a color material, in addition to toners of four colors of C (cyan), M (magenta), Y (yellow), and K (black). A toner image formed by such clear toner is fixed to a recording medium such as transfer paper on which an image is formed by the CMYK toners, and as a result, a visual effect and a tactile effect (hereinafter, referred to as a "surface effect") are realized on a surface of the recording medium.

The surface effect to be realized differs depending on the toner image formed by the clear toner and a manner of fixing the same. There is the surface effect, which simply applies gloss, and the surface effect, which reduces the gloss. Also, the surface effect to be applied to only a part and the surface effect to provide a texture and a watermark by the clear toner are also required in addition to the surface effect applied to an entire surface. There also is a case in which surface protection is required.

It is already known to perform a total amount controlling process to limit a total amount of the toner to be used so as not to be larger than a certain threshold when the image is formed by the toners of the four colors of CYMK in general, because an image quality at the time of printing is deteriorated due to blur of a character or uneven fixing caused by scattered toner when a used amount of the toner is too large.

A maximum value of the total amount of the toner to be used is fixed in general also in a five-color image forming device obtained by adding the clear toner to the image forming device equipped with the toners of the four colors, so that total amount control for each color material becomes more severe when the number of color materials increases.

Since there is limitation of an attached amount of the clear toner in this manner, there is a case in which the clear toner is not attached as specified by a user; technology to confirm the same in advance is known.

For example, Japanese Patent Application Laid-open No. 2009-265405 discloses a method of switching to a printing process in which the attached amount of the toner becomes automatically larger in order to avoid deterioration in visibility due to a small attached amount of a special toner. Specifically, the technology of Japanese Patent Application Laid-open No. 2009-265405 has a function to preview-display an effect with respect to the attached amount of the toner in advance in a test chart and allow the user to specify the same, and switch to two-pass printing in which the recording medium is allowed to pass through a fixing device twice to perform the printing when a specified effect cannot be obtained when the printing is executed. According to this, the user may confirm whether an expected attached amount of the clear toner may be realized before the printing.

However, in the technology of Japanese Patent Application Laid-open No. 2009-265405, there is a problem that the user cannot confirm a portion of a document in which the specified effect cannot be obtained by the clear toner.

That is to say, the conventional technology has a problem that the user cannot grasp the portion in which the effect by the clear toner cannot be obtained due to lack of clear toner by an effect of the total amount controlling process of the toner in a pixel level in advance before executing a print job by a printing device. It is difficult to find a slight difference in color and the portion in which the effect by the clear toner cannot be obtained in the pixel level even when a printed matter is checked after the printing is executed.

In the technology of Japanese Patent Application Laid-open No. 2009-265405, although the effect of the total amount control may be avoided by switching to the two-pass printing, a system configuration to pass through the fixing device twice is required in order to realize the two-pass printing, so that there is a problem that an excessive system configuration is required.

In view of the above, there is a need to provide the information processing apparatus, the information processing system, and the display method capable of allowing the user to grasp the portion in which the effect by the clear toner cannot be obtained due to the total amount controlling process of the toner in the pixel level before the printing is executed, thereby easily obtaining the printed matter with a desired effect by the clear toner while maintaining the printing quality without the excessive system configuration.

SUMMARY OF THE INVENTION

It is an object of the present invention to at least partially solve the problems in the conventional technology.

An information processing apparatus is connected to a printing device that is equipped with a colored color toner and a colorless clear toner and forms an image on a recording medium based on color plane data to attach the color toner and clear toner plane data to attach the clear toner. The information processing apparatus includes: a total amount control unit that applies a total amount controlling process to the color plane data and clear plane data in which a density value to specify a transparent image by the clear toner is specified, to perform correction such that a sum of density values of all pixels composing the color plane data and the clear plane data becomes not larger than a certain value in a predetermined case; a clear toner plane generating unit that generates the clear toner plane data based on gloss control plane data in which a type of a surface effect, which is a visual or tactile effect to be applied to the recording medium, and the density value to specify a region in the recording medium to which the surface effect is applied are specified, the clear plane data, and the color plane data; a determining unit that determines whether the total amount controlling process is applied to the clear plane data of the clear toner plane data and the color plane data; a difference calculating unit that calculates a difference between the density value of a pixel of the clear toner plane data and the density value of the pixel of the clear toner plane data to which the total amount controlling process is applied, for each pixel, when the total amount controlling process is applied to the clear plane data of the clear toner plane data and the color plane data; an extracting unit that extracts an inconsistent region composed of a pixel in which the difference is not smaller than a predetermined threshold; and a display unit that displays the inconsistent region.

An information processing system is connected to a printing device that is equipped with a colored color toner and a colorless clear toner and forms an image on a recording medium based on color plane data to attach the color toner and clear toner plane data to attach the clear toner. The information processing system includes: a total amount control unit that applies a total amount controlling process to the color plane data and clear plane data in which a density value to specify a transparent image by the clear toner is specified, to perform correction such that a sum of density values of all pixels composing the color plane data and the clear plane data becomes not larger than a certain value in a predetermined case; a clear toner plane generating unit that generates the clear toner plane data based on gloss control plane data in which a type of a surface effect, which is a visual or tactile effect to be applied to the recording medium, and the density value to specify a region in the recording medium to which the surface effect is applied are specified, the clear plane data, and the color plane data; a determining unit that determines whether the total amount controlling process is applied to the clear plane data of the clear toner plane data and the color plane data; a difference calculating unit that calculates a difference between the density value of a pixel of the clear toner plane data and the density value of the pixel of the clear toner plane data to which the total amount controlling process is applied, for each pixel, when the total amount controlling process is applied to the clear plane data of the clear toner plane data and the color plane data; an extracting unit that extracts an inconsistent region composed of a pixel in which the difference is not smaller than a predetermined value; and a display unit that displays the inconsistent region.

A display method is executed by an information processing system connected to a printing device that is equipped with a colored color toner and a colorless clear toner and forms an image on a recording medium based on color plane data to attach the color toner and clear toner plane data to attach the clear toner. The display method includes: a total amount controlling step of applying a total amount controlling process to the color plane data and clear plane data in which a density value to specify a transparent image by the clear toner is specified, to perform correction such that a sum of density values of all pixels composing the color plane data and the clear plane data becomes not larger than a certain value in a predetermined case; a clear toner plane generating step of generating the clear toner plane data based on gloss control plane data in which a type of a surface effect, which is a visual or tactile effect to be applied to the recording medium, and the density value to specify a region in the recording medium to which the surface effect is applied are specified, the clear plane data, and the color plane data; a determining step of determining whether the total amount controlling process is applied to the clear plane data of the clear toner plane data and the color plane data; a difference calculating step of calculating a difference between the density value of a pixel of the clear toner plane data and the density value of the pixel of the clear toner plane data to which the total amount controlling process is applied, for each pixel, when the total amount controlling process is applied to the clear plane data of the clear toner plane data and the color plane data; an extracting step of extracting an inconsistent region composed of a pixel in which the difference is not smaller than a predetermined value; and a displaying step of displaying the inconsistent region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a view illustrating a data configuration of a surface effect selection table;

FIG. 21 is an illustrative diagram illustrating an example of a difference information table;

DETAILED DESCRIPTION OF THE PREFERRED EMBODIMENTS

Embodiments of an information processing apparatus, an information processing system, and a display method are hereinafter described in detail with reference to the attached drawings.

First Embodiment

Figure 1:
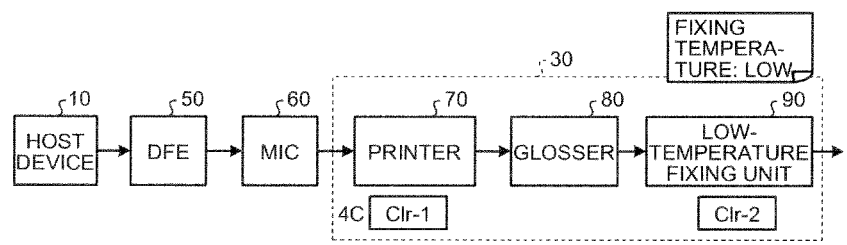
FIG. 1 is a view illustrating a configuration of an image forming system according to a first embodiment.

A configuration of an image forming system according to a first embodiment is first described with reference to FIG. 1. In this embodiment, the image forming system is composed of a printer control device (DFE: Digital Front End) 50 (hereinafter, referred to as a "DFE 50"), an interface controller (MIC: Mechanism I/F Controller) 60 (hereinafter, referred to as a "MIC 60"), a printer 70, and a glosser 80 and a low-temperature fixing unit 90 as post processing units connected to one another. The DFE 50 communicates with the printer 70 through the MIC 60 to control image formation by the printer 70. Also, a host device 10 such as a PC (Personal Computer) is connected to the DFE 50, and the DFE 50 receives image data from the host device 10 and generates image data for the printer 70 to form a toner image corresponding to CMYK toners and a clear toner by using the image data to transmit to the printer 70 through the MIC 60. The printer 70 is equipped with at least the CMYK toners and the clear toner and with an image forming unit including a photosensitive element, a charger, a developing unit, and a photosensitive-element cleaner, an exposing unit, and a fixing unit for each toner.

Meanwhile, the printer 70, the glosser 80, and the low-temperature fixing unit 90 compose a printing device 30.

Herein, the clear toner is a transparent (colorless) toner without a color material. Meanwhile, transparent (colorless) is intended to mean that transmission is 70% or higher, for example.

The printer 70 applies optical beam from the exposing unit according to the image data transmitted from the DFE 50 through the MIC 60 to form the toner image corresponding to each toner on the photosensitive element, transfers the same to paper as a recording medium, and fixes the same by applying heat and pressure at a temperature in a predetermined range (normal temperature) by the fixing unit. According to this, the image is formed on the paper. A configuration of such printer 70 is well-known, so that a detailed description thereof is herein omitted. Meanwhile, the paper is an example of the recording medium and the recording medium is not limited thereto. For example, synthetic paper, plastic paper and the like may also be applied as the recording medium.

The glosser 80 is controlled to be turned on or off by on/off information specified by the DFE 50, and when this is turned on, this applies pressure to the image formed on the paper by the printer 70 at high temperature and high pressure, then cools the same and detaches the paper on which the image is formed from a main body. According to this, a total attached amount of the toner of each pixel to which a predetermined or larger amount of toner is attached is uniformly compressed over an entire image formed on the paper. The low-temperature fixing unit 90 is equipped with an image forming unit including a photosensitive element, a charger, a developing unit, and a photosensitive-element cleaner for the clear toner, an exposing unit, and a fixing unit to fix the clear toner, and image data of a clear toner plane to be described later (hereinafter, also referred to as "clear toner plane data") generated by the DFE 50 to use the low-temperature fixing unit 90 is input thereto. When the DFE 50 generates the image data of the clear toner plane (clear toner plane data) to be used by the low-temperature fixing unit 90, the low-temperature fixing unit 90 forms the toner image by the clear toner by using the same and superimposes the toner image on the paper to which the pressure is applied by the glosser 80 to fix the same to the paper by applying heat or pressure lower than usual by the fixing unit.

Here, the image data (document data) input from the host device 10 is described. In the host device 10, the image data is generated by an image processing application installed in advance (such as a data processing unit 120, a plane data generating unit 122, a print data generating unit 123 to be described later) and is transmitted to the DFE 50. Such image processing application may handle image data of a special color plane as against image data of each color plane such as an RGB plane and a CMYK plane in which a value of density (referred to as a density value) of each color is defined for each pixel. The special color plane is the image data to attach a special toner and ink such as white, gold, and silver in addition to basic colors such as CHYK and RGB, and is the data for a printer equipped with such special toner and ink. The special color plane might add R to the CMYK basic colors or add Y to the RGB basic colors in order to improve color reproducibility. In general, the clear toner also is handled as one of special colors.

In this embodiment, the clear toner as the special color is used to form a surface effect, which is a visual or tactile effect to be applied to the paper, and to form a transparent image such as a watermark and a texture other than the above-described surface effect on the paper.

Therefore, the image processing application of the host device 10 generates image data of a gloss control plane (hereinafter, also referred to as "gloss control plane data") and/or image data of a clear plane (hereinafter, also referred to as "clear plane data") according to specification by a user as the image data of the special color plane in addition to image data of a color plane (hereinafter, also referred to as "color plane data") with respect to input image data.

Figure 2:
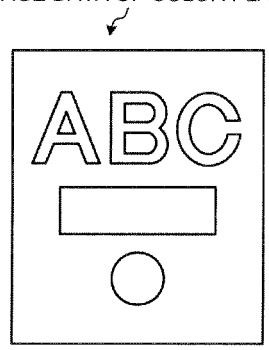
FIG. 2 is a view illustrating an example of image data of a color plane.

Herein, the color plane data is the image data in which the density value of a color such as RGB and CMYK is defined for each pixel. In the color plane data, one pixel is represented by eight bits according to specification of a color by the user. FIG. 2 is an illustrative diagram illustrating an example of the color plane data. In FIG. 2, the density value corresponding to the color specified by the user by the image processing application is applied to each drawing object such as "A", "B", and "C".

The gloss control plane data is the image data in which a region to which the surface effect is applied and a type of the surface effect are specified to perform control to attach the clear toner according to the surface effect, which is the visual or tactile effect to be applied to the paper.

In the gloss control plane, each pixel is represented by the density value in a range from "0" to "255" by eight bits as in the color plane such as RGB and CMYK, and the type of the surface effect is associated with the density value (density value may be represented by 16 bits or 32 bits or 0 to 100%). The same value is set to a range to which the same surface effect is to be applied irrespective of the density of the clear toner actually attached, so that the region may be easily identified from the image data if needed even when there is no data indicating the region. That is to say, the type of the surface effect and the region to which the surface effect is applied are indicated by the gloss control plane (data indicating the region may be separately added).

Herein, the host device 10 generates the gloss control plane data in a vector format by setting the type of the surface effect for the drawing object specified by the user by the image processing application as the density value as a gloss control value for each drawing object.

Each pixel composing the gloss control plane data corresponds to the pixel of the color plane data. Meanwhile, the density value of each pixel becomes a pixel value in each image data. The color plane data and the gloss control plane data are composed in units of page.

Figures 3, 4:
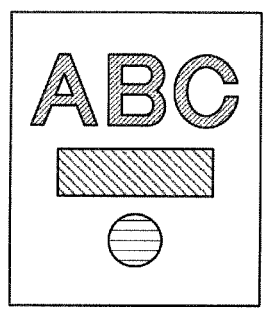
FIG. 3 is a view illustrating a type of a surface effect regarding presence of gloss.
FIG. 4 is a view illustrating image data of a gloss control plane image data as an image.

The surface effects roughly include the one regarding presence of gloss, surface protection, a watermark with embedded information, a texture and the like as the types. As the surface effect regarding the presence of the gloss, there are roughly four types as illustrated in FIG. 3: specular gloss (PG: Premium Gloss), solid gloss (G: Gloss), halftone-dot matt (M: Matt), and matt (PM: Premium Matt) in descending order of a degree of gloss (glossiness). Hereinafter, the specular gloss, the solid gloss, the halftone-dot matt, and the matt are sometimes referred to as "PG", "G", "M", and "PM", respectively.

The specular gloss and the solid gloss have a high degree of gloss, on the other hand, the halftone-dot matt and the matt reduce the gloss, and especially, the matt realizes lower glossiness than the glossiness of normal paper. In the drawing, the specular gloss indicates glossiness Gs of 80 or higher, the solid gloss indicates solid glossiness of a primary color or a secondary color, the halftone-dot matt indicates the glossiness of the primary color with 30% of halftone dots, and the matt indicates the glossiness of 10 or lower. Deviation of the glossiness is represented by ΔGs and this is set to 10 or lower. For each type of the surface effect, a high density value is associated with the surface effect, which gives a high level of gloss, and a low density value is associated with the surface effect, which reduces the gloss. The surface effect such as the watermark and the texture is associated with an intermediate density value. A character, a background pattern and the like are used as the watermark, for example. The texture indicates the character and a pattern and may apply the tactile effect in addition to the visual effect. For example, a stained glass pattern may be realized by the clear toner. The specular gloss and the solid gloss are used as a substitute for the surface protection. Meanwhile, the user specifies the region of the image indicated by the image data, which is a processing target, to which the surface effect is applied and the type of the surface effect to be applied to the region by means of the image processing application. In the host device 10, which executes the image processing application, the density value corresponding to the surface effect specified by the user is set for the drawing object, which composes the region specified by the user, and according to this, the gloss control plane data is generated. Correspondence relationship between the density value and the type of the surface effect is to be described later.

FIG. 4 is an illustrative diagram illustrating an example of the gloss control plane data. In an example of the gloss control plane in FIG. 4, an example in which the surface effect "PG (specular gloss)" is applied to a drawing object "ABC", the surface effect "G (solid gloss)" is applied to a drawing object "(rectangle)", and the surface effect "M (halftone-dot matt)" is applied to a drawing object "(circle)" by the user is illustrated. Meanwhile, the density value set for each surface effect is the density value defined corresponding to the type of the surface effect in a density value selection table (refer to FIG. 9) to be described later.

Figures 5, 6:
FIG. 5 is a view illustrating an example of image data of a clear plane.
FIG. 6 is a view illustrating an example of a density value selection table.

The clear plane data is the image data in which the transparent image such as the watermark and the texture other than the above-described surface effect is specified. FIG. 5 is an illustrative diagram illustrating an example of the clear plane data. In an example in FIG. 5, a watermark "Sale" is specified by the user.

In this manner, the gloss control plane data and the clear plane data, which are the image data of the special color plane, are generated by the image processing application of the host device 10 by a plane other than that of the color plane data. A PDF (Portable Document Format) is used as a format of the color plane data, the gloss control plane data, and the clear plane data, and pieces of PDF image data of each plane are integrated into document data. Meanwhile, the data format of the image data of each plane is not limited to the PDF and any format may also be used.

Herein, the image processing application of the host device 10 converts the type of the surface effect specified by the user to the density value to generate the gloss control plane data. Such conversion is performed with reference to the density value selection table stored in advance in a storage unit of the host device 10. The density value selection table is table data in which the type of the surface effect and the density value of the gloss control plane corresponding to the type of the surface effect are associated with each other. FIG. 6 is a view illustrating an example of the density value selection table. In an example in FIG. 6, the density value of the gloss control plane corresponding to the region for which "PG" (specular gloss) is specified by the user is "98%", the density value of the gloss control plane corresponding to the region for which "G" (solid gloss) is specified is "90%", the density value of the gloss control plane corresponding to the region for which "M" (halftone-dot matt) is specified is "16%", and the density value of the gloss control plane corresponding to the region for which "PM" (matt) is specified is "6%", respectively.

The density value selection table is a part of data of a surface effect selection table (to be described later) stored in the DFE 50 generated from the surface effect selection table obtained by a control unit of the host device 10 at a predetermined timing to be stored in the storage unit. Meanwhile, it is also possible to configure such that the surface effect selection table is stored in a storage server (cloud) on a network such as the Internet and a control unit 15 obtains the surface effect selection table from the server to perform generation from the obtained surface effect selection table. However, it is required that the surface effect selection table stored in the DFE 50 and the surface effect selection table stored in the storage unit of the host device are the same data.

Figures 7, 8:
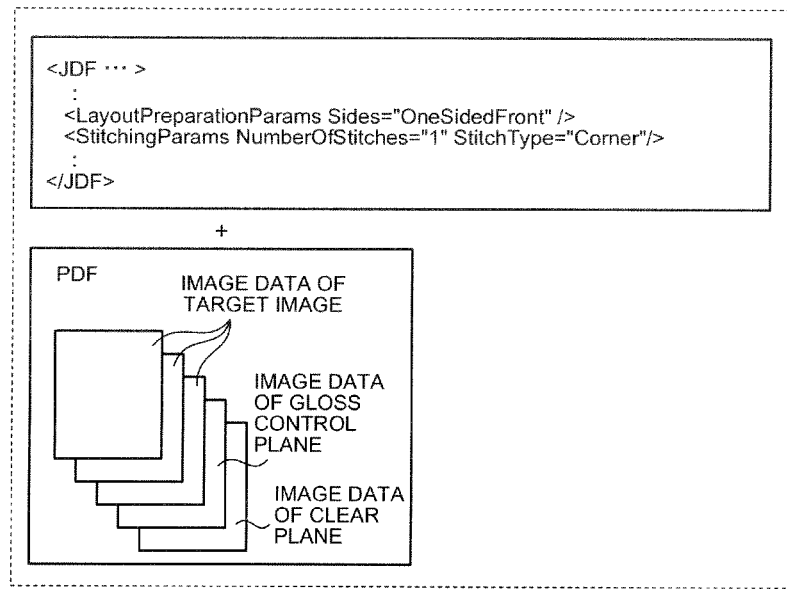
FIG. 7 is a view illustrating correspondence relationship among a drawing object, a coordinate, and a density value in the image data of the gloss control plane in FIG. 4.
FIG. 8 is a schematic diagram schematically illustrating a configuration example of print data.

Specifically, the image processing application of the host device 10 generates the gloss control plane data by setting the density value (gloss control value) of the drawing object for which a predetermined surface effect is specified by the user to a value corresponding to the type of the surface effect with reference to the density value selection table illustrated in FIG. 6. For example, a case in which the user specifies to apply "PG", "G", and "N" to the region in which "ABC" is displayed, the rectangular region, and the circular region, respectively, of a target image, which is the color plane data illustrated in FIG. 2 is assumed. In this case, the host device 10 sets the density value of the drawing object ("ABC") for which "PG" is specified by the user to "98%", sets the density value of the drawing object ("rectangle") for which "G" is specified to "90%", and sets the density value of the drawing object ("circle") for which "M" is specified to "16%" with reference to the density value selection table, thereby generating the gloss control plane data. The gloss control plane data generated by the host device 10 is the data in the vector format represented as a set of coordinates of points, parameters of equations of lines and planes connecting the points, and the drawing objects indicating a filled portion and a special effect. FIG. 4 is a view illustrating the gloss control plane data as an image and FIG. 7 is a view illustrating correspondence relationship among the drawing object, the coordinate, and the density value in the gloss control plane data in FIG. 4.

The host device 10 generates the document data obtained by integrating the gloss control plane data, the image data of the target image (color plane data), and the clear plane data.

Then, the host device 10 generates print data based on the document data. The print data includes the image data of the target image (color plane data), the gloss control plane data, the clear plane data, and a job command to specify printer setting, aggregation setting, and duplex setting, for example, for the printer. FIG. 8 is a schematic diagram schematically illustrating a configuration example of the print data. Although JDF (Job Definition Format) is used as the job command in an example in FIG. 8, the job command is not limited thereto. The JDF illustrated in FIG. 8 is a command, which specifies "single sided printing with stapling" as the aggregation setting. Also, the print data may be converted to page description language (PDL) such as PostScript or this may be maintained in the PDF when the DFE 50 supports the same.

Figure 9:
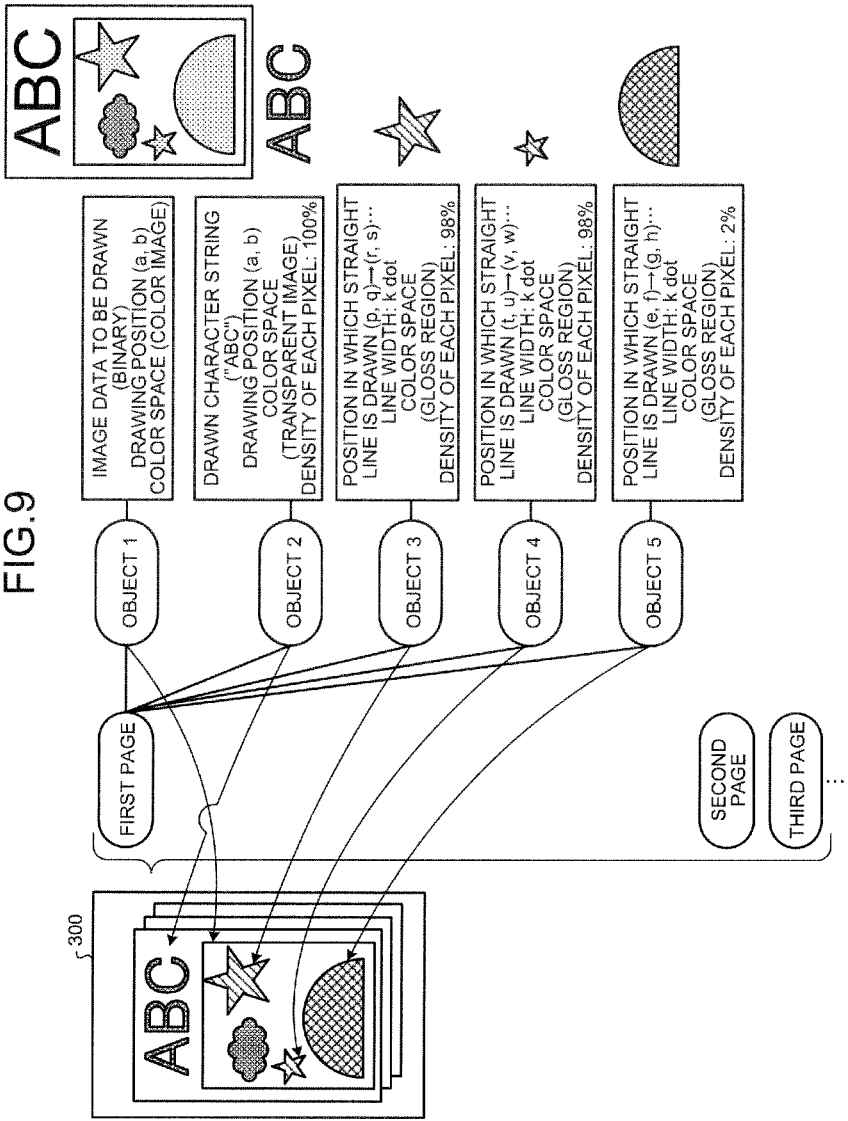
FIG. 9 is a schematic diagram illustrating an example of a configuration of document data.

FIG. 9 is a view illustrating an example of a detailed configuration of the print data. The print data includes drawing information indicating one or a plurality of drawing regions (objects) specified by the color plane data, the gloss control plane data, and the clear plane data in one page (same page). FIG. 9 illustrates an example of a case in which the print data includes five objects, which are objects 1 to 5, in a first page, for example.

In the example illustrated in FIG. 9, the object 1 indicates the drawing region of a color image specified by the color plane data. The object 2 indicates the drawing region of the transparent image specified by the clear plane data. Each of the objects 3 to 5 indicates the drawing region specified by the gloss control plane data.

The print data includes information indicating a position of the drawing region, a color space, and the density as the drawing information for each object. The position of the drawing region is indicated by coordinate information or a set of pieces of the coordinate information, for example. The color space indicates which of the color image, the transparent image, and a gloss region each drawing region (object) is. The color image is specified by the color plane data. The transparent image is specified by the clear plane data. The gloss region is specified by the gloss control plane data. In the example in FIG. 9, a case in which the density value (0 to 100%) is set as the density of each object is illustrated as an example. Also, in the example illustrated in FIG. 9, a case in which a drawing region group of the color image specified by the color plane data is handled as one object (drawing region) is illustrated.

Figure 10:
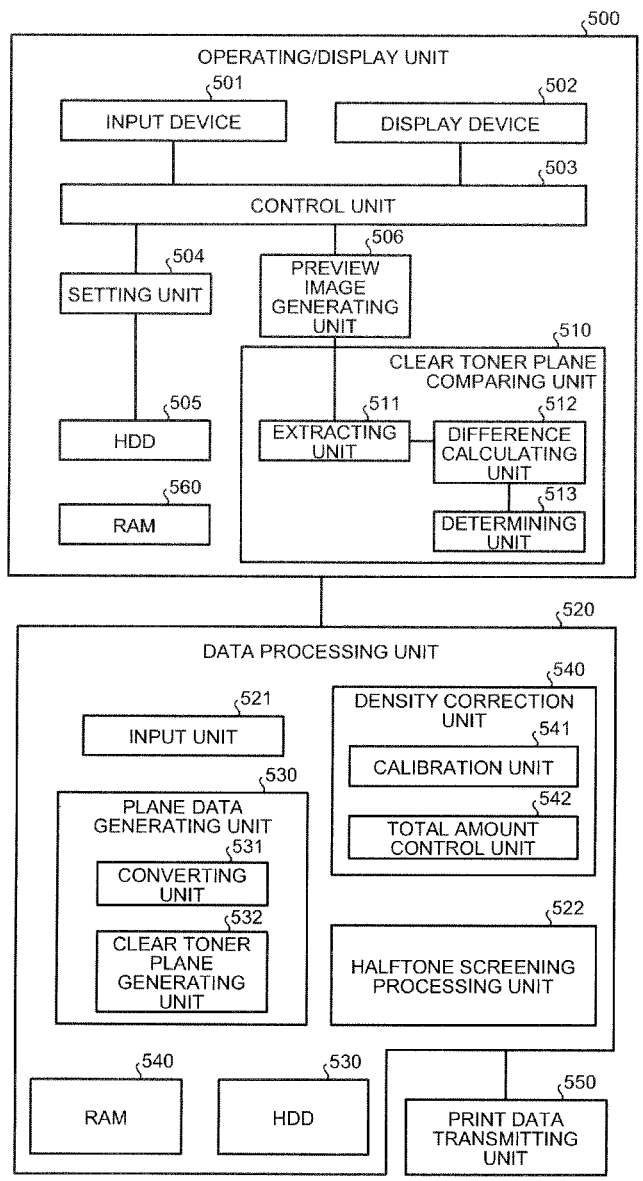
FIG. 10 is a view illustrating a functional configuration of a DFE.

Next, a functional configuration of the DFE 50 is described. FIG. 10 is a block diagram illustrating the functional configuration of the DFE 50. As illustrated in FIG. 10, the DFE 50 is principally provided with an operating/display unit 500, a data processing unit 520, and a print data transmitting unit 550.

The data processing unit 520 is principally configured to receive the print data from the host device 10, generate the clear toner plane data based on the color plane data, the clear plane data, and the gloss control plane data included in the received print data, and apply a total amount controlling process to the color plane data and the clear plane data, which compose the clear toner plane data.

The print data transmitting unit 550 transmits the clear toner plane data generated by the data processing unit 520 to the MIC 60 as the print data.

The operating/display unit 500 displays various screens and information to the user and accepts an operation input from the user. In this embodiment, the operating/display unit 500 generates a preview image obtained by estimating a print result to display to the user and compares the clear toner plane data before the total amount controlling process and the clear toner plane data to which the total amount controlling process is performed to display a comparison result to the user.

First, the data processing unit 520 is described in detail. The data processing unit 520 is principally provided with an input unit 521, a plane data generating unit 530, a density correction unit 540, a halftone screening processing unit 522, a RAM (Random Access Memory) 540, and a HDD (Hard Disk Drive) as illustrated in FIG. 10.

The input unit 521 receives the image data transmitted from the host device 10 (for example, the print data illustrated in FIG. 8) to store in the HDD 530 and reads the print data stored in the HDD 530 to develop in the RAM 540. Herein, the RAM 540 is used as a working memory. In the HDD 530, the surface effect selection table to be described later is stored in addition to the print data received from the host device 10.

The plane data generating unit 530 is provided with a converting unit 531 and a clear toner plane generating unit 532. The converting unit 531 performs linguistic interpretation of the input print data to convert the print data represented in the vector format to a raster format and converts the color space represented in an RGB format and the like to the color space in a CMYK format, thereby outputting eight-bit image data of the color plane of each of CMYK (color plane data), eight-bit gloss control plane data, and eight-bit clear plane data. Herein, the DFE 50 converts the gloss control plane data in the vector format output from the host device 10 to the raster format, and as a result, the DFE 50 outputs the gloss control plane data by setting the type of the surface effect for the drawing object specified by the user by the image processing application as the density value for each pixel.

The clear toner plane generating unit 532 inputs the eight-bit gloss control plane data converted by the converting unit 531 and inputs the eight-bit color plane data of each of CMYK to which gamma correction is performed by a calibration unit 541 and the clear plane data transmitted from the input unit 521. The clear toner plane generating unit 532 generates the clear toner plane data by using the eight-bit color plane data of each of CMYK, the eight-bit gloss control plane data, and the clear plane data. For example, the clear toner plane generating unit 532 determines the surface effect for the density value (pixel value) of each pixel, which composes the gloss control plane data, with reference to the surface effect selection table to be described later from the gloss control plane data and decides to turn on or off the glosser 80 according to the determination, and appropriately generates an inverse mask and a solid mask by using the eight-bit color plane data of each of CHYK, which is input, thereby appropriately generating two-bit clear toner plane data to attach the clear toner. Then, according to a result of the determination of the surface effect, the clear toner plane generating unit 532 appropriately generates the clear toner plane data used by the printer 70 and the clear toner plane data used by the low-temperature fixing unit 90 to output, and outputs the on/off information indicating on or off of the glosser 80.

Herein, the inverse mask is configured to uniformize the total attached amount obtained by combining the CMYK toners and the clear toner on each pixel composing a target region to which the surface effect is to be applied. Specifically, the image data obtained by adding all the density values of the pixel composing the target region in the color plane data of CMYK and subtracting the added value from a predetermined value becomes the inverse mask. For example, an inverse mask 1 described above is represented by a following equation (1).

$$Clr=100-(C+M+Y+K), \text{ where } Clr=0 \text{ when } Clr<0 \text{ is satisfied} \quad (1)$$

In the equation (1), each of Clr, C, M, Y, and K represents a density ratio converted from the density value of each pixel for each of the clear toner and the toners of C, M, Y, and K, respectively. That is to say, by the equation (1), the total attached amount obtained by adding the attached amount of the clear toner to the total attached amount of the toners of C, M, Y, and K is set to 100% for all the pixels composing the target region to which the surface effect is applied. Meanwhile, when the total attached amount of the toners of C, M, Y, and K is equal to or larger than 100%, the clear toner is not attached and the density ratio thereof is set to 0%. This is because a portion in which the total attached amount of the toners of C, M, Y, and K is larger than 100% is smoothed by a fixing process. In this manner, by setting the total attached amount on all the pixels composing the target region to which the surface effect is applied equal to or larger than 100%, surface irregularity caused by a difference in the total attached amount of the toner is removed in the target region, and as a result, the gloss by regular reflection of light is generated. However, there is the inverse mask obtained by other than the equation (1), and there may be a plurality of types of the inverse masks.

For example, the inverse mask may be configured to uniformly attach the clear tonner to each pixel. The inverse mask in this case is also referred to as the solid mask and is represented by a following equation (2).

$$Clr=100 \quad (2)$$

Meanwhile, there may be the pixel with which the density ratio other than 100% is associated in target pixels to which the surface effect is applied and there may be a plurality of patterns of the solid masks.

The inverse mask may also be obtained by multiplication of a background exposing ratio of each color, for example. The inverse mask in this case is represented by a following equation (3), for example.

$$Clr=100\times\{(100-C)/100\}\times\{(100-M)/100\}\times\{(100-Y)/100\}\times\{(100-K)/100\} \quad (3)$$

In the above-described equation (3), (100−C)/100 represents the background exposing ratio of C, (100−M)/100 represents the background exposing ratio of M, (100−Y)/100 represents the background exposing ratio of Y, and (100−K)/100 represents the background exposing ratio of K, respectively.

The inverse mask may also be obtained by a method based on an assumption that the halftone dot having a maximum area ratio controls smoothness, for example. The inverse mask in this case is represented by a following equation (4), for example.

$$Clr=100-\max(C,M,Y,K) \quad (4)$$

In the above-described equation (4), max(C, M, Y, K) represents that the density value of the color having the maximum density value among CMYK becomes a representative value.

In short, the inverse masks may be represented by any of the above-described equations (1) to (4).

The surface effect selection table is the table, which indicates the correspondence relationship between the density value as the gloss control value indicating the surface effect and the type of the surface effect, and indicates the correspondence relationship among them, control information regarding the post processing unit corresponding to the configuration of the image formation system, the clear toner plane data used by the printer 70, and the clear toner plane data used by the post processing unit. A configuration of the image forming system might differ variously; in this embodiment, this is the configuration in which the glosser 80 and the low-temperature fixing unit 90 are connected to the printer 70 as the post processing units. Therefore, the control information regarding the post processing unit corresponding to the configuration of the image forming system is the on/off information indicating on or off of the glosser 80. Also, there is the clear toner plane data used by the low-temperature fixing unit 90 as the clear toner plane data used by the post processing unit. FIG. 11 is a view illustrating a data configuration of the surface effect selection table. Meanwhile, although the surface effect selection table may be configured to indicate the correspondence relationship among the control information regarding the post processing unit, image data of a clear tone plane 1 used by the printer 70 (clear toner plane data 1), image data of a clear toner plane 2 used by the post processing unit (clear toner plane data 2), the density value, and the type of the surface effect for each of different configurations of the image forming system, the data configuration according to the configuration of the image forming system according to this embodiment is illustrated in FIG. 11. In the correspondence relationship between the type of the surface effect and the density value illustrated in the drawing, each type of the surface effect is associated with each range of the density values. Also, each type of the surface effect is associated with a rate of the density (density ratio) converted from the value, which represents the range of the density values (representative value), in units of 2%. Specifically, the surface effect to apply the gloss (specular effect and solid effect) is associated with the range of the density values ("212" to "255") with the density ratio of 84% or higher and the surface effect to reduce the gloss (halftone-dot matt and matt) is associated with the range of the density values ("1" to "43") with the density ratio of 16% or lower. Also, the surface effect such as the texture and the background watermark is associated with the range of the density values with the density ratio of 20% to 80%.

More specifically, the specular gloss (PM: Premium Gloss) is associated as the surface effect with the pixel values "238" to "255", for example, and different types of the specular gloss are associated with three ranges of the pixel values "238" to "242", the pixel values "243" to "247", and the pixel values "248" to "255". Also, the solid gloss (G: Gloss) is associated with the pixel values "212" to "232" and different types of the solid gloss are associated with four ranges of the pixel values "212" to "216", the pixel values "217" to "221", the pixel values "222" to "227", and the pixel values "228" to "232". Also, the halftone-dot matt (M: Matt) is associated with the pixel values "23" to "43" and different types of the halftone-dot matt are associated with four ranges of the pixel values "23" to "28", the pixel values "29" to "33", the pixel values "34" to "38", and the pixel values "39" to "43". Also, the matt (PM: Premium Matt) is associated with the pixel values "1" to "17" and different types of the matt are associated with three ranges of the pixel values "1" to "7", the pixel values "8" to "12", and the pixel values "13" to "17". The different types of the same surface effect are different in the equation to obtain the clear toner plane data to be used by the printer 70 and the low-temperature fixing unit 90 but the operations performed by a printer main body and the post processing unit are the same. Meanwhile, the fact that no surface effect is applied is associated with the density value "0".

FIG. 11 illustrates the on/off information indicating on or off of the glosser 80 and contents of the clear toner plane data 1 (Clr-1 in FIG. 1) used by the printer 70 and the clear toner plane data 2 used by the low-temperature fixing unit 90 corresponding to the pixel value and the surface effect. For example, when the surface effect is the specular gloss, it is indicated that the glosser 80 is turned on and that the clear toner plane data 1 used by the printer 70 indicates the inverse mask and there is no clear toner plane data 2 (Clr-2 in FIG. 1) used by the low-temperature fixing unit 90. The inverse mask is obtained by the above-described equation (1), for example.

Also, when the density value is in the range of "228" to "232" and the surface effect is the solid gloss, it is indicated that the glosser 80 is turned off and that the clear toner plane data 1 used by the printer 70 is the inverse mask 1 and there is no clear toner plane data 2 used by the low-temperature fixing unit 90. Meanwhile, the inverse mask 1 may be represented by any of the above-described equations (1) to (4). Since the glosser 80 is turned off, the total attached amount of the toner to be smoothed is different, so that the surface irregularity increases compared with the specular gloss, and as a result, the solid gloss with lower glossiness than the specular gloss is obtained. When the surface effect is the halftone-dot matt, it is indicated that the glosser 80 is turned off and that the clear toner plane data 1 used by the printer 70 indicates halftone (halftone-dot) and there is no clear toner plane data 2 used by the low-temperature fixing unit 90. When the surface effect is the matt, it is indicated that the glosser 80 may be turned on or off and that there is no clear toner plane data 1 used by the printer 70 and the clear toner plane data 2 used by the low-temperature fixing unit 90 indicates the solid mask. The solid mask is obtained by the above-described equation (2), for example.

The clear toner plane generating unit 532 determines the surface effect associated with each pixel value indicated by the gloss control plane with reference to the above-described surface effect selection table and determines on or off of the glosser 80 to determine the clear toner plane data used by the printer 70 and the low-temperature fixing unit 90. Meanwhile, the clear toner plane generating unit 532 determines on or off of the glosser 80 for each page. As described above, the clear toner plane generating unit 532 appropriately generates the clear toner plane data according to a result of the determination to output and outputs the on/off information for the glosser 80. The clear toner plane data generated by the clear toner plane generating unit 532 is referred to as clear toner plane data $\alpha$.

With reference to FIG. 10 again, the density correction unit 540 is provided with the calibration unit 541 and a total amount control unit 542. The calibration unit 541 inputs the eight-bit color plane data of each of CMYK output from the converting unit 530 and performs the gamma correction to the eight-bit color plane data of each of CMYK by using a gamma curve of 1D_LUT generated by the calibration. The calibration unit 541 outputs the eight-bit color plane data of each of CMYK to which the gamma correction is performed to the clear toner plane generating unit 532 of the plane data generating unit 530 as the data to generate the inverse mask.

The total amount control unit 542 applies the total amount controlling process to the clear toner plane data $\alpha$ generated by the clear toner plane generating unit 532 to correct such that a sum of the density values of all the pixels of the color plane data and the clear toner plane data is a certain value or lower. The clear toner plane data to which the total amount controlling process is applied is referred to as clear toner plane data $\beta$.

Specifically, the total amount control unit 542 performs correction of the density of the color plane data of each of CMYK and the clear plane data with respect to the density of each pixel of the color plane data of each of CMYK and the clear plane data so as not to be larger than the total attached amount of the toner of the printer.

In general, a toner amount is approximately 260% when regarding the maximum density value in the density values 0 to 255 of each image of C, M, Y, and K as 100%. For example, when a ratio of the sum of the density values of the toners of C, M, Y, and K with respect to 255 is 200% in a certain pixel, the clear toner must not be larger than 60%, that is to say, the density value 153. Therefore, the total amount control unit 542 corrects the density value of the clear toner such that the density value does not become larger than 153. The clear toner plane data $\beta$ obtained as a result is actually printed.

Figures 12, 13:
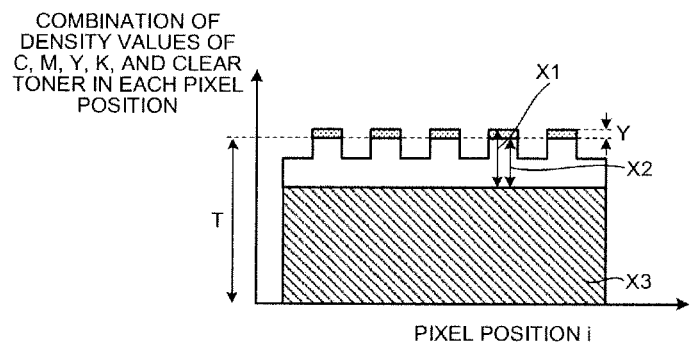
FIG. 12 is a graph for illustrating a total amount controlling process.
FIG. 13 is a schematic diagram illustrating an example of clear toner plane comparison setting screen.

FIG. 12 is a graph for illustrating the total amount controlling process. In the graph illustrated in FIG. 12, an abscissa axis represents a pixel position i on the color plane data of C, M, Y, and K and the clear plane data. A longitudinal axis represents a combined value of the density values of the toners of C, M, Y, and K and the clear toner in each pixel position i.

In an example in FIG. 12, an ideal density value X1 of the pixel of the clear toner in the clear plane data is 254 (X1=254) and a density value X3 in each pixel position of the color plane data of C, M, Y, and K is 421 (X3=421). Therefore, a combined density value of the color plane data of C, M, Y, and K and the clear plane data is 675 and this is larger than the density value 665 corresponding to general 260% by a value of 10. Therefore, the total amount control unit 542 corrects the density value of the clear toner plane data to a density value X2=244 of the pixel of the clear toner by subtracting the density value of 10 from the color plane data and the clear toner plane data $\alpha$. According to this, the total amount controlling process is applied to the clear toner plane data $\alpha$ and the clear toner plane data $\beta$ after the correction of the density value is obtained.

The eight-bit color plane data of each of CMYK after the gamma correction is input to the halftone screening processing unit 522, and this performs a halftone screening process to convert the input color plane data to the data format of two-bit image data and the like of each of CMYK, for example, to output to the printer 70 and outputs the two-bit color plane data and the like of each of CMYK after the halftone screening process. Meanwhile, two-bit is an example and there is no limitation.

The print data transmitting unit 550 integrates the two-bit data of each of CMYK after the halftone screening process and the two-bit clear toner plane data generated by the clear toner plane generating unit 532 and transmits the integrated image data to the MIC 60. Meanwhile, since there is a case in which the clear toner plane generating unit 532 does not generate at least one of the clear toner plane data used by the printer 70 and the clear toner plane data used by the low-temperature fixing unit 90, the clear toner plane data generated by the clear toner plane generating unit 532 is integrated by the print data transmitting unit 550, and when the clear toner plane generating unit 532 generates neither of the clear toner plane data, the image data obtained by integrating the two-bit color plane data of each of CMYK is output from the print data transmitting unit 550. As a result, four to six two-bit image data are transmitted from the DFE 50 to the MIC 60. The print data transmitting unit 550 also outputs the on/off information for the glosser 80 output by the clear toner plane generating unit 532 to the MIC 60.

Next, the operating/display unit 500 of the DFE 50 is described in detail with reference to FIG. 10 again. The operating/display unit 500 is principally provided with an input device 501, a display device 502, a control unit 503, a setting unit 504, a preview image generating unit 506, a clear toner plane comparing unit 510, a HDD 505, and a RAM 560 as illustrated in FIG. 10.

Various setting values are stored in the HDD 505. The RAM 560 is used as the working memory.

The clear toner plane comparing unit 510 compares the clear toner plane data α before the total amount controlling process is applied and the clear toner plane data β after the total amount controlling process is applied. The clear toner plane comparing unit 510 is provided with a determining unit 513, a difference calculating unit 512, and an extracting unit 511 as illustrated in FIG. 10.

The determining unit 513 determines whether the total amount controlling process by the total amount control unit 542 is applied to the clear toner plane data by the density value of the pixel of the clear toner plane data.

The difference calculating unit 512 calculates a difference between the density value of the pixel of the clear toner plane data α before the total amount controlling process is applied and the density value of the pixel of the clear toner plane data β to which the total amount controlling process is applied for each pixel when the determining unit 513 determines that the total amount controlling process is applied to the clear toner plane data.

More specifically, the difference calculating unit 512 calculates the difference between the density value of the surface effect of the pixel of the clear toner plane data α and the density value of the surface effect of the pixel of the clear toner plane data β for each pixel for the pixel generated based on the gloss control plane data in the clear toner plane data. Also, the difference calculating unit 512 calculates the difference between the density value of the pixel of the transparent image of the clear toner plane data α and the density value of the pixel of the transparent image of the clear toner plane data α for each pixel for the pixel generated based on the clear plane data in the clear toner plane data.

The extracting unit 511 determines whether a difference value calculated by the difference calculating unit 512 is not smaller than a value of a same density range as a threshold and extracts an inconsistent region from the clear toner plane data β. Herein, the inconsistent region is a region composed of the pixel in which difference value calculated by the difference calculating unit 512 is not smaller than the value of the same density range. On the other hand, a region other than the inconsistent region, that is to say, the region composed of the pixel in which difference value calculated by the difference calculating unit 512 is smaller than the value of the same density range is referred to as a consistent region.

The input device 501 is an input device such as a keyboard and a mouse, for example. Especially, in this embodiment, this accepts a predetermined input from the user on the preview image displayed on the display device 502.

The display device 502 is a display device such as a display device. The control unit 503 performs input control from the input device 501 and display control to the display device 502. In this embodiment, the display device 502 displays the preview image, which is the image obtained by estimating the print result, generated by the preview image generating unit 506. The display device 502 also displays the inconsistent region and the consistent region to be described later on the preview image.

The display device 502 and the control unit 503 serve as a display unit. Also, the input device 501 and the control unit 503 serve as the input unit.

The display device 502 displays the inconsistent region and the consistent region in display forms different from each other by the display control by the control unit 503; more specifically, the display device 502 displays the inconsistent region and the consistent region by specific colors different from each other by the display control by the control unit 503.

Also, when the control unit 503 determines that a position of an operation input by the user of the input device 501 is included in the inconsistent region, the display device 502 displays a name of the surface effect and the difference value in the inconsistent region.

The setting unit 504 allows the display device 502 to display a clear toner plane comparison setting screen. Then, the setting unit 504 accepts inputs of the value of the same density range, specification of the color as the display form of the inconsistent region, and the specification of the color as the display form of the consistent region by the user from the clear toner plane comparison setting screen by means of the input device 501 and sets the value of the same density range, the color specification of the inconsistent region, and the color specification of the consistent region, which are accepted, by storing them in the HDD 505.

FIG. 13 is a schematic diagram illustrating an example of the clear toner plane comparison setting screen. In the clear toner plane comparison setting screen, an input field 1301 of the value of the same density range and a specification field 1302 of the display color to specify the color of the inconsistent region and the color of the consistent region are displayed as illustrated in FIG. 13. The setting unit 504 sets the value specified by the user in the input field 1301 as the value of the same density range and sets the color specified by the user in the specification field 1302 of the display color as the color of the inconsistent region and the color of the consistent region.

With reference to FIG. 10 again, the preview image generating unit generates the preview image based on the clear toner plane data α when the total amount controlling process is not applied to the clear toner plane data and based on the clear toner plane data β when the total amount controlling process is applied to the clear toner plane data.

The MIC 60 outputs device configuration information indicating a device configuration equipped as the post processing unit to the DFE 50. The MIC 60 is connected to the DFE 50 and the printer 70, receives the color plane data and the clear toner plane data from the DFE 50 to distribute each image data to a corresponding device, and controls the post processing unit. More specifically, the MIC 60 outputs the CMYK color plane data out of the image data output from the DFE 50 to the printer 70, also outputs the clear toner plane data used by the printer 70 to the printer 70 if this is present, turns on or off the glosser 80 by using the on/off information output from the DFE 50, and outputs the clear toner plane data used by the low-temperature fixing unit 90 to the low-temperature fixing unit 90 if this is present. The glosser 80 may switch a path on which the fixing is performed and the path on which this is not performed by the on/off information. The low-temperature fixing unit 90 may switch on or off and switch the paths as in the glosser 80 depending on presence of the clear toner plane data.

Figure 14:
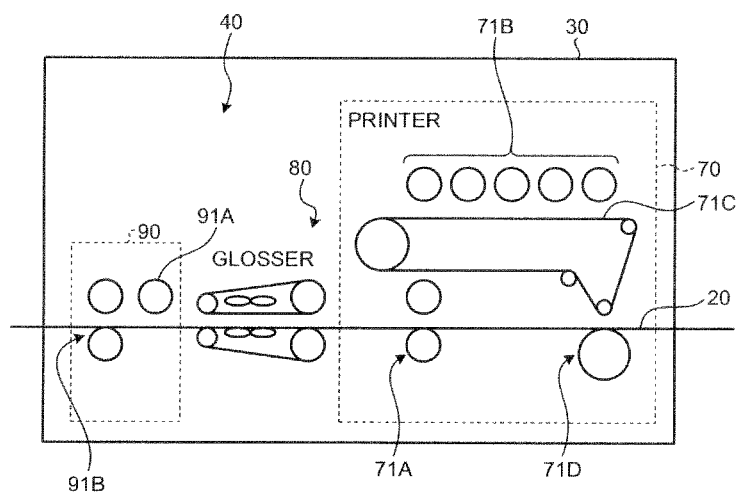
FIG. 14 is a configuration diagram of a printing device.

Also, as illustrated in FIG. 14, the printing device 30 composed of the printer 70, the glosser 80, and the low-temperature fixing unit 90 is provided with a conveying path 20 to convey the paper, which is the recording medium. Meanwhile, in detail, the printer 70 is provided with a plurality of electrophotographic photosensitive drums 71B, a transfer belt 71C on which the toner image formed on the photosensitive drum 71B is transferred, a transfer device 71D to transfer the toner image on the transfer belt 71C to the paper, and a fixing unit 71A to fix the toner image on the paper to the paper. The paper is conveyed on the conveying path 20 by a conveying member not illustrated to be conveyed through positions of the printer 70, the glosser 80, and the low-temperature fixing unit 90 in this order. Then, after the image is formed and the surface effect is applied by the processes sequentially performed by the devices, the paper is conveyed on the conveying path by a conveying mechanism not illustrated to be discharged out of the printing device 30.

Figure 15:
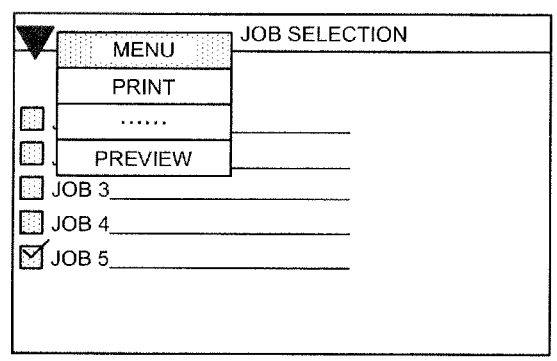
FIG. 15 is a schematic diagram illustrating an example of a job selection screen.

Next, a display process by the DFE 50 configured as described above is described. FIG. 15 is a schematic diagram illustrating an example of a job selection screen. First, the control unit 503 displays the job selection screen illustrated in FIG. 15 on the display device 502. Then, the user selects a desired job by checking a desired check box from the job selection screen and further selects whether to "print" or "preview" from the menu screen. When the "print" is selected, a printing process of the image data specified by the selected job is executed and when the "preview" is selected, a preview display process of the image data specified by the selected job is executed.

Figure 16:
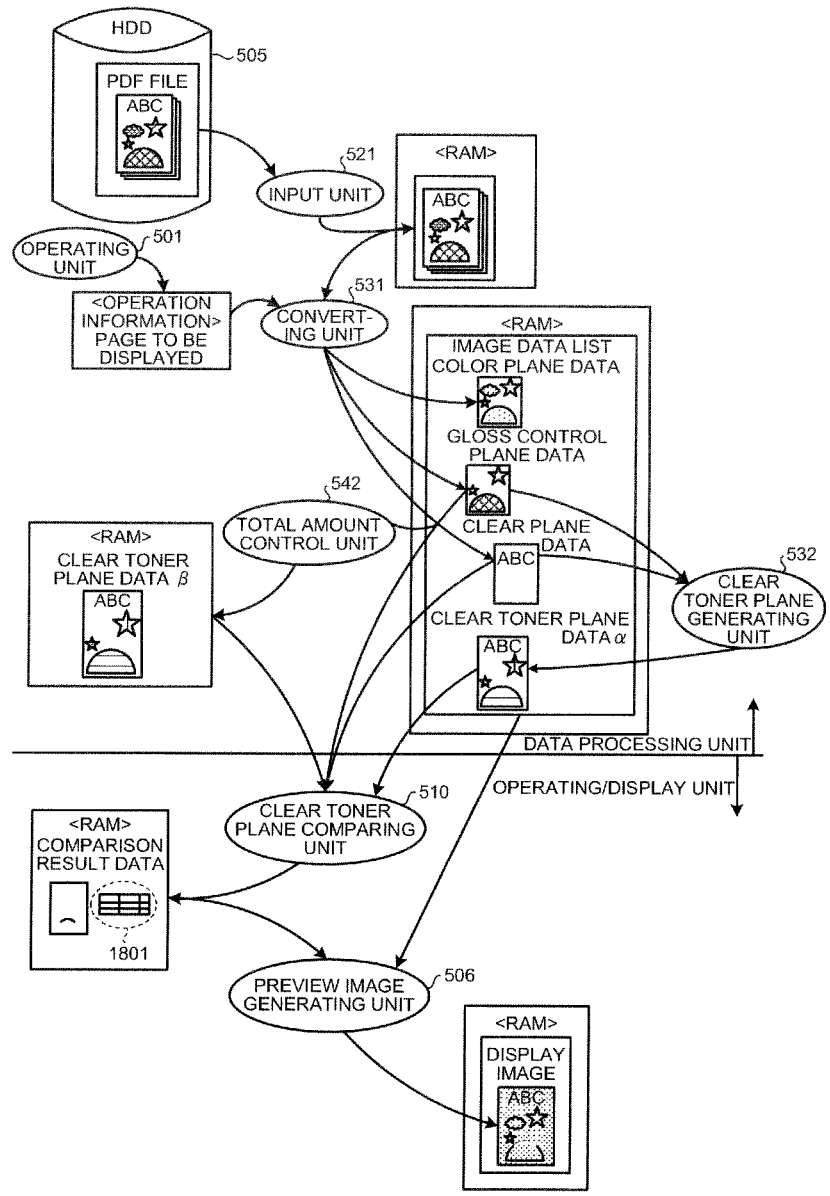
FIG. 16 is an illustrative diagram schematically illustrating an entire flow of a display process.
Figure 17:
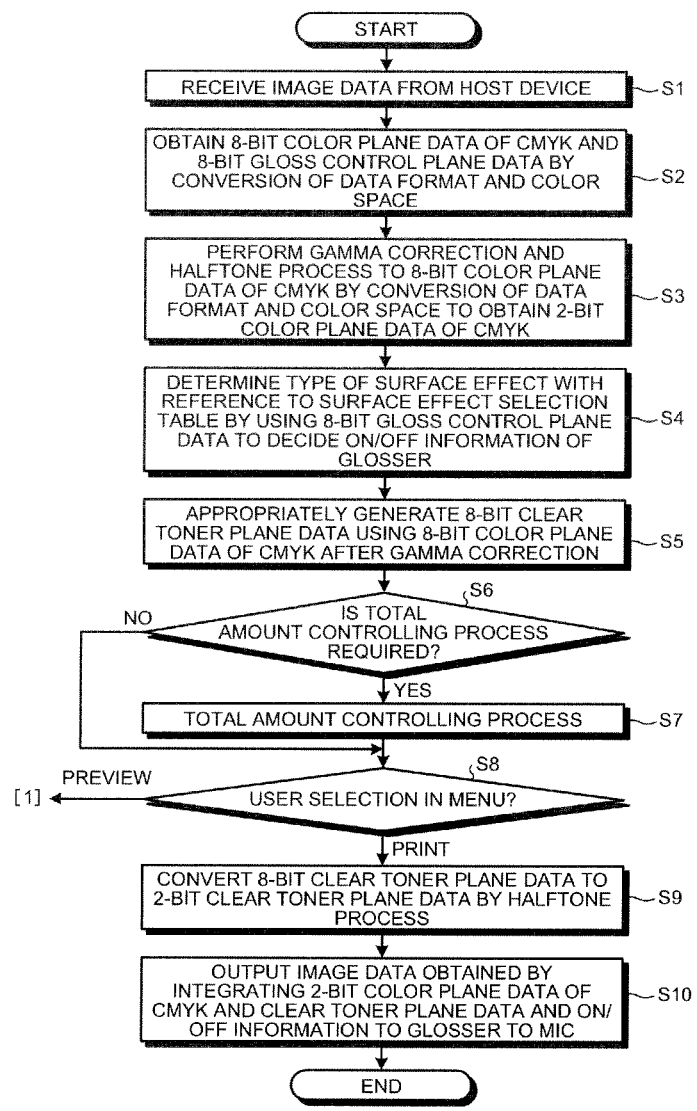
FIG. 17 is a flowchart illustrating a procedure of the display process.
Figure 18:
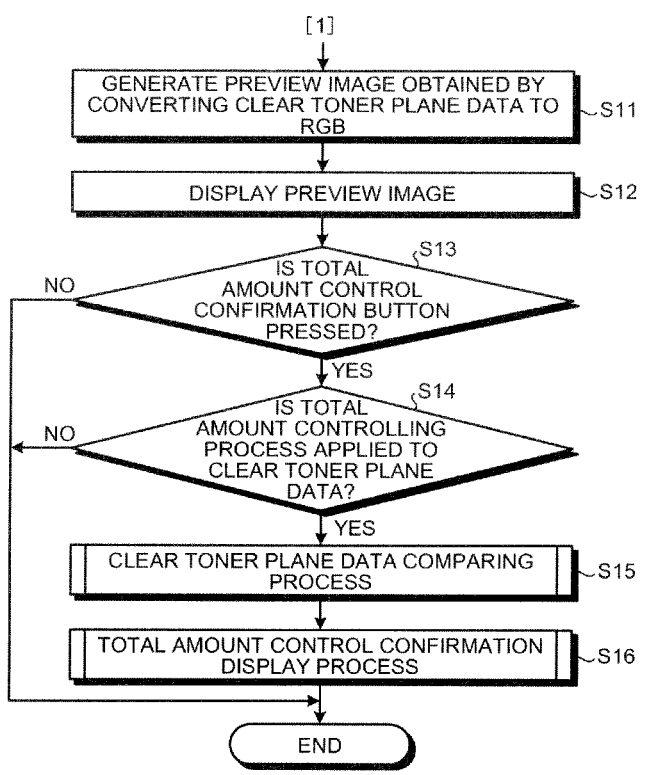
FIG. 18 is a flowchart illustrating (a rest of) the procedure of the display process.

FIG. 16 is an illustrative diagram schematically illustrating an entire flow of the display process. FIGS. 17 and 18 are flowcharts illustrating a procedure of the display process. When the DFE 50 receives the image data (refer to FIG. 8) from the host device 10 (step S1), the received image data is temporarily stored in the HDD 505. The input unit 521 reads the image data from the HDD 505 and stores the same in the RAN 560. Then, the converting unit 531 performs the linguistic interpretation of the image data in the RAM 560 to convert the image data represented in the vector format to the raster format and converts the color space represented in the RGB format to the color space in the CHYK format, thereby obtaining the eight-bit color plane data of each of CMYK and the eight-bit gloss control plane data (step S2).

In the converting process, the gloss control plane data in FIG. 4, that is to say, the gloss control plane data in which the density value to specify the surface effect is specified for each drawing object as illustrated in FIG. 7 is converted to the gloss control plane data in which the density value is specified for each pixel composing the drawing object.

That is to say, the converting unit 531 applies the density value set for the drawing object to the pixel in the range of the coordinate corresponding to the drawing object of the gloss control plane data illustrated in FIG. 7, thereby converting the gloss control plane data. According to this, the gloss control plane data is converted to the gloss control plane data in which the surface effect is set for each pixel.

When the eight-bit gloss control plane data is output, the calibration unit 541 of the DFE 50 performs the gamma correction to the eight-bit color plane data of each of CMYK by using the gamma curve of 1D_LUT generated by the calibration and the halftone screening processing unit 522 performs a halftone process to convert the image data after the gamma correction to the data format of the two-bit color plane data of each of CHYK to output to the printer 70, thereby obtaining the two-bit color plane data of each of CMYK after the halftone process (step S3).

Also, the clear toner plane generating unit 532 of the DFE 50 determines the surface effect specified for each pixel value indicated by the gloss control plane data with reference to the above-described surface effect selection table by using the eight-bit gloss control plane data. Then, the clear toner plane generating unit 532 determines in this manner for all the pixels composing the gloss control plane data. Meanwhile, the density value of the same range is basically indicated for all the pixels composing the region to which each surface effect is applied in the gloss control plane data. Therefore, the clear toner plane generating unit 532 determines that the pixel in the vicinity determined to have the same surface effect is included in the region to which the same surface effect is applied. In this manner, the clear toner plane generating unit 532 determines the region to which the surface effect is applied and the type of the surface effect applied to the region. Then, the clear toner plane generating unit 532 decides to turn on or off the glosser 80 according to the determination (step S4).

Next, the clear toner plane generating unit 532 of the DFE 50 appropriately generates the eight-bit clear toner plane data to attach the clear toner by appropriately using the eight-bit color plane data of each of CMYK after the gamma correction (step S5).

Next, the total amount control unit 542 determines whether the total amount controlling process is required for the clear toner plane data based on the sum of the density values of the pixels of the color plane data and the clear toner plane data (step S6). Then, the total amount control unit 542 determines whether the total amount controlling process is required by determining whether the sum of the density values of the pixels of the color plane data and the clear toner plane data is not smaller than a predetermined value, for example.

When the sum of the density values of the pixels of the color plane data and the clear toner plane data is not smaller than a predetermined value and the like and when it is determined that the total amount controlling process is required (step S6: Yes), the total amount control unit 542 applies the above-described total amount controlling process to the clear toner plane data α (that is to say, the color plane data and the clear toner plane data α) to generate the clear toner plane data β (step S7).

On the other hand, when the sum of the density values of the pixels of the color plane data and the clear toner plane data is smaller than a predetermined value and the like and when it is determined that the total amount controlling process is not required at step S6 (step S6: No), the total amount controlling process at step S7 is not performed. In this case, the clear toner plane data α is handled as the clear toner plane data β.

Next, the control unit 503 determines the selection of the user input in the menu screen on the job selection screen illustrated in FIG. 15 (step S8). When the user selects to "print" in the menu screen (step S8: printing), the halftone screening processing unit 522 converts the 8-bit clear toner plane data β obtained by using the eight-bit image data to the two-bit clear toner plane data by the halftone process (step S9).

Next, the print data transmitting unit 550 of the DFE 50 integrates the two-bit color plane data of each of CMYK after the halftone process obtained at step S3 and the two-bit clear toner plane data generated at step S9 and outputs the integrated image data and the on/off information indicating on or off of the glosser 80 decided at step S4 to the MIC 60 (step S10).

Meanwhile, when the clear toner plane generating unit 532 does not generate the clear toner plane data at step S5, only the two-bit color plane data of each of CMYK after the halftone process obtained at step S3 are integrated to be output to the MIC 60 at step S10.

At step S8, when the user selects to "preview" in the menu screen (step S8: preview), the preview image generating unit 506 generates the preview image obtained by converting the clear toner plane data to RGB (step S11). Then, the control unit 503 displays the generated preview image on the display device 502 (step S12).

Figure 19:
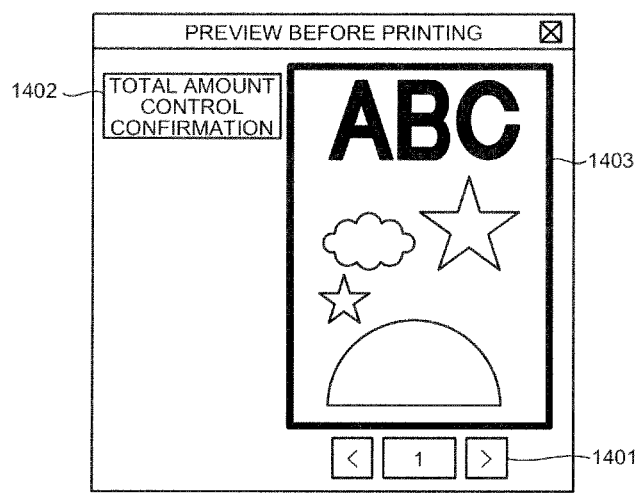
FIG. 19 is an illustrative diagram illustrating an example of a preview screen before printing displayed on a display device 502.

FIG. 19 is an illustrative diagram illustrating an example of a preview screen before printing displayed on the display device 502. As illustrated in FIG. 19, a page turn button 1401 and a total amount control confirmation button 1402 are displayed on the preview screen in addition to the preview image 1403. The page turn button 1401 is the button pressed by the user to turn the page when the preview image has a plurality of pages.

The total amount control confirmation button 1402 is the button pressed by the user to confirm/display whether the effect by the clear toner is not reduced as a result of the total amount controlling process when the total amount controlling process is applied.

With reference to FIG. 18 again, when the preview screen is displayed, the control unit 503 determines whether the total amount control confirmation button 1402 is pressed by event notification and the like (step S13). When the total amount control confirmation button 1402 is not pressed for a certain period of time (step S13: No), the process is finished.

On the other hand, when the total amount control confirmation button 1402 is pressed (step S13: Yes), the determining unit 513 determines whether the total amount controlling process is applied to the clear toner plane data (step S14). Specifically, the determining unit 513 determines whether the total amount controlling process is applied by the sum of the density values of the clear toner plane data. When it is determined that the total amount controlling process is not applied to the clear toner plane data (step S14: No), the process is finished.

On the other hand, when it is determined that the total amount controlling process is applied to the clear toner plane data (step S14: Yes), the clear toner plane comparing unit 510 performs a comparing process of the clear toner plane data α before the total amount controlling process and the clear toner plane data α after the total amount controlling process (step S15).

Figure 20:
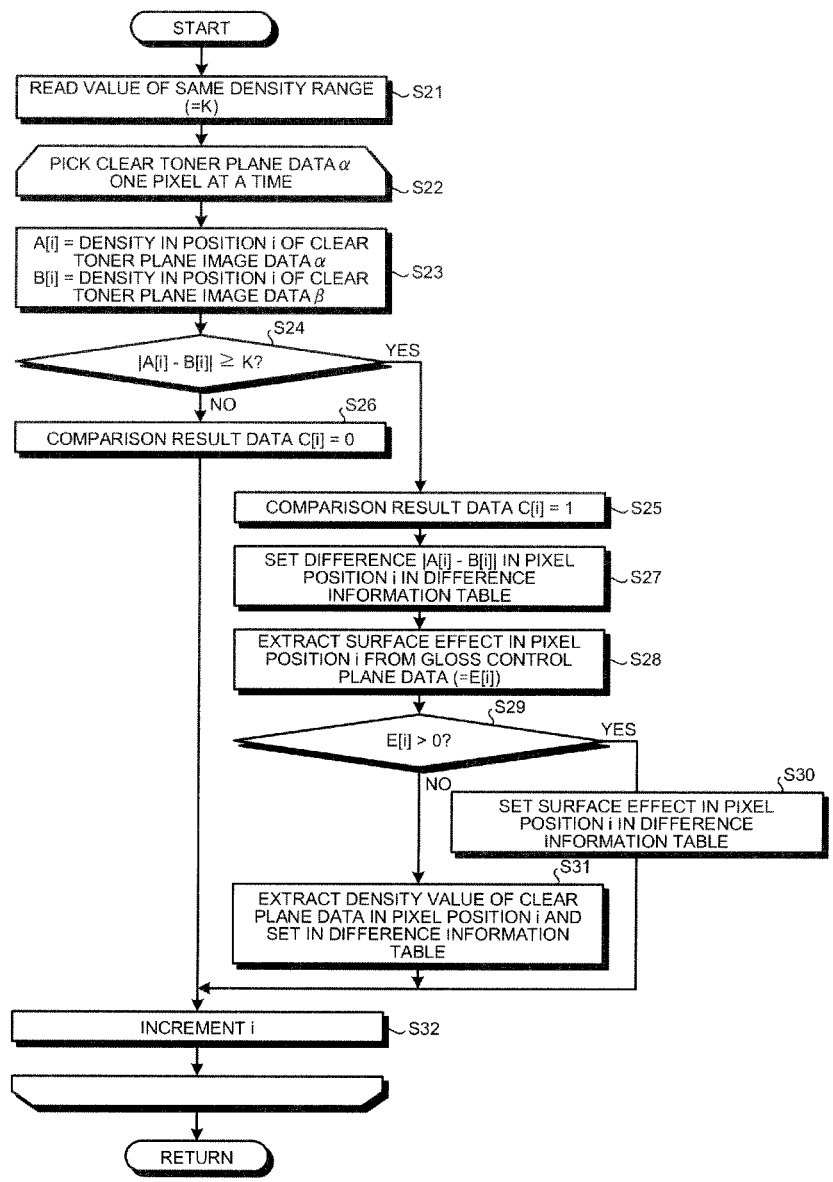
FIG. 20 is a flowchart illustrating a procedure of a comparing process of clear toner plane data.

Herein, the comparing process of the clear toner plane data is described in detail. FIG. 20 is a flowchart illustrating a procedure of the comparing process of the clear toner plane data. First, the difference calculating unit 512 reads the value of the same density range set by the setting unit 504 from the HDD 505 and sets the same to K (step S21). Next, the difference calculating unit 512 picks the clear toner plane data α one pixel at a time and performs processes at steps S23 to S32 hereinafter described for each pixel while sequentially incrementing the pixel position i from 1 and repeats this by the number of the pixels (step S22).

That is to say, the difference calculating unit 512 sets the density of the pixel in the position i of the clear toner plane data α before the total amount controlling process to A[i] and sets the density of the pixel in the position i of the clear toner plane data β after the total amount controlling process to B[i] (step S23).

Then, the difference calculating unit 512 calculates a difference |A[i]−B[i]| between the density A[i] of the pixel in the position i of the clear toner plane data α and the density B[i] of the pixel in the position i of the clear toner plane data β. Then, the extracting unit 511 determines whether the difference |A[i]−B[i]| is not smaller than the value of the same density range K (step S24). When the difference |A[i]−B[i]| is smaller than the value of the same density range K (step S24: No), i is incremented (step S32) and the process returns back to step S23.

On the other hand, when the difference |A[i]−B[i]| is not smaller than the value of the same density range K at step S24 (step S24: Yes), the extracting unit 511 sets comparison result data C[i] to 1 (step S25) and further sets the difference |A[i]−B[i]| in the pixel position i in a difference information table (step S26). Then, the extracting unit 511 extracts the density value of the surface effect in the pixel position i from the gloss control plane data and sets the extracted density value of the surface effect to E[i] (step S27).

Next, the extracting unit 511 determines whether the extracted density value of the surface effect is larger than 0 (step S29). When the density value of the surface effect is larger than 0 (step S29: Yes), this determines that the surface effect is set, that is to say, the density value of the surface effect of not the clear plane data but the gloss control plane data is used in the pixel position and sets the extracted density value of the surface effect in the pixel position i and the surface effect "gloss control plane" in the difference information table (step S30). Meanwhile, the difference information table is generated in the RAM 560.

On the other hand, when the density value of the surface effect is not larger than 0 at step S29 (step S29: No), the extracting unit 511 determines that the surface effect is not set, that is to say, the density value of not the gloss control plane data but the clear plane data is used in the pixel position i and this extracts the density value in the pixel position i from the clear plane data and sets the extracted density value and the surface effect "clear plane" in the difference information table (step S31). Then, this increments i (step S32) and returns back to step S23.

The extracting unit 511 repeatedly executes the above-described processes at steps S23 to S32 for every pixel of the clear toner plane data. According to this, the comparison result between the clear toner plane data α and the clear toner plane data β is registered in the difference information table. That is to say, the difference information table is the data obtained by extracting a range of the pixels having the difference not smaller than the value of the same density range by the comparison result between the clear toner plane data α and the clear toner plane data β.

FIG. 21 is an illustrative diagram illustrating an example of the difference information table. As illustrated in FIG. 20, the pixel position of the pixel in which |A[i]−B[i]| is not smaller than the value of the same density range K, the surface effect, the density value, and the difference |A[i]−B[i]| are registered in the difference information table in units of one record. The region of the pixels indicated by such difference information table is the inconsistent region. That is to say, by the comparing process of the clear toner plane data, the inconsistent region in which the difference |A[i]−B[i]| of the density value between the clear toner plane data α and the clear toner plane data α is not smaller than the value of the same density range K, in other words, the inconsistent region in which the effect by the clear toner cannot be obtained as expected is extracted.

Next, with reference to FIG. 18 again, when the inconsistent region is extracted by the comparing process of the clear toner plane data (step S15), the operating/display unit 500 performs a total amount control confirmation display process (step S16) and finishes the process.

Figure 22:
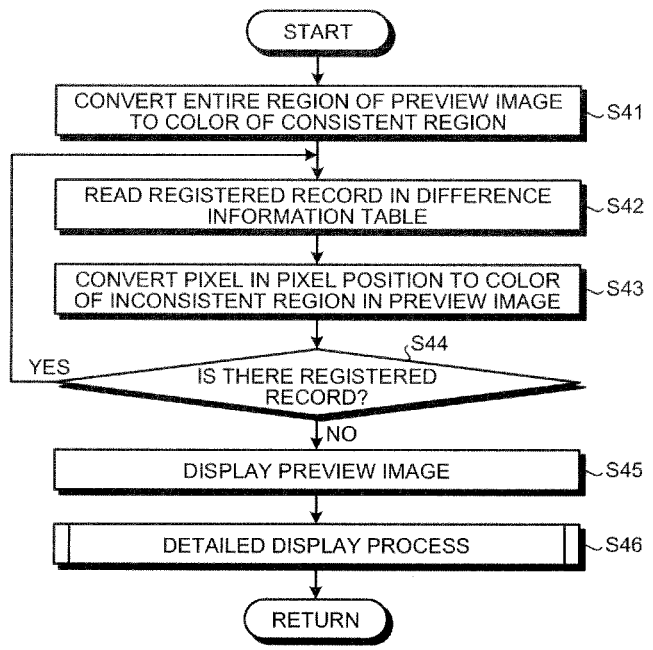
FIG. 22 is a flowchart illustrating a procedure of a total amount control confirmation display process.

Next, the total amount control confirmation display process at step S16 is described in detail. FIG. 22 is a flowchart illustrating a procedure of the total amount control confirmation display process. First, the preview image generating unit 506 converts an entire region of the preview image to the display color of the consistent region (step S41).

Next, the preview image generating unit 506 reads the record registered in the difference information table in the RAM 560 (step S42). Then, the preview image generating unit 506 converts the pixel in the pixel position to the display color of the inconsistent region in the preview image (step S43).

Then, the preview image generating unit 506 repeatedly executes the processes at steps S42 and S43 for all the records registered in the difference information table (step S44, S44: Yes). When the processes at steps S42 and S43 are completed for all the records registered in the difference information table (step S44: No), the control unit 503 displays the preview image in which the inconsistent region and the consistent region are converted to respective display colors on the display device 502 (step S45). According to this, the preview image in which the total amount control confirmation display is performed is displayed.

Figure 23:
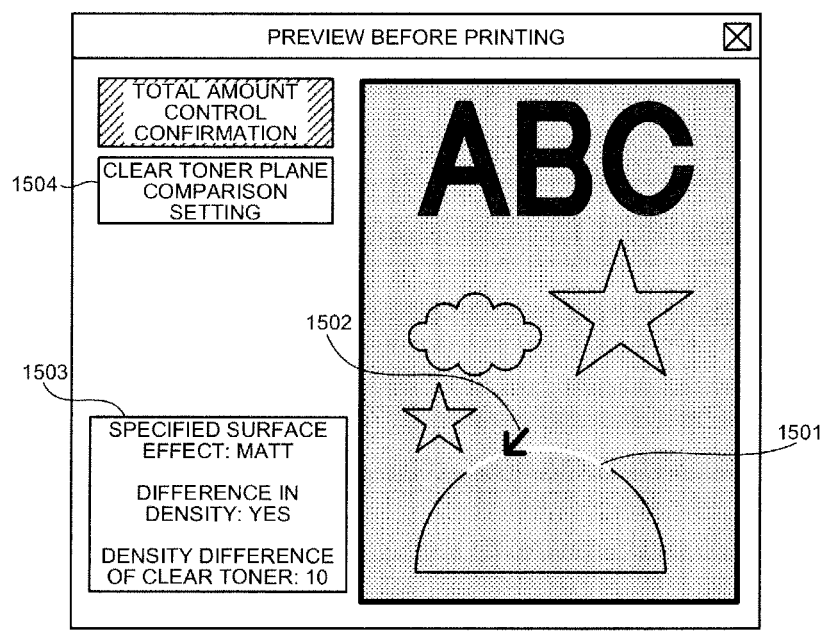
FIG. 23 is an illustrative diagram illustrating an example of the preview screen in which a preview image in which total amount control confirmation display is performed is displayed.

FIG. 23 is an illustrative diagram illustrating an example of the preview screen on which the preview image in which the total amount control confirmation display is performed is displayed. In FIG. 23, a white color portion of the display color represented by a reference numeral 1501 is the inconsistent region and the other region is the consistent region displayed in the display color of the consistent region.

In the preview screen, when a clear toner plane comparison setting button 1504 is pressed, the above-described clear toner plane comparison setting screen illustrated in FIG. 13 is displayed and it becomes possible to specify the value of the same density range and the display colors of the inconsistent region and the consistent region.

When the user indicates (hovers the mouse over) the inconsistent region by a mouse pointer of the input device 501 on the preview screen in FIG. 23, the control unit 503 performs detailed display of the inconsistent region in a display frame 1503 (step S46).

Figure 24:
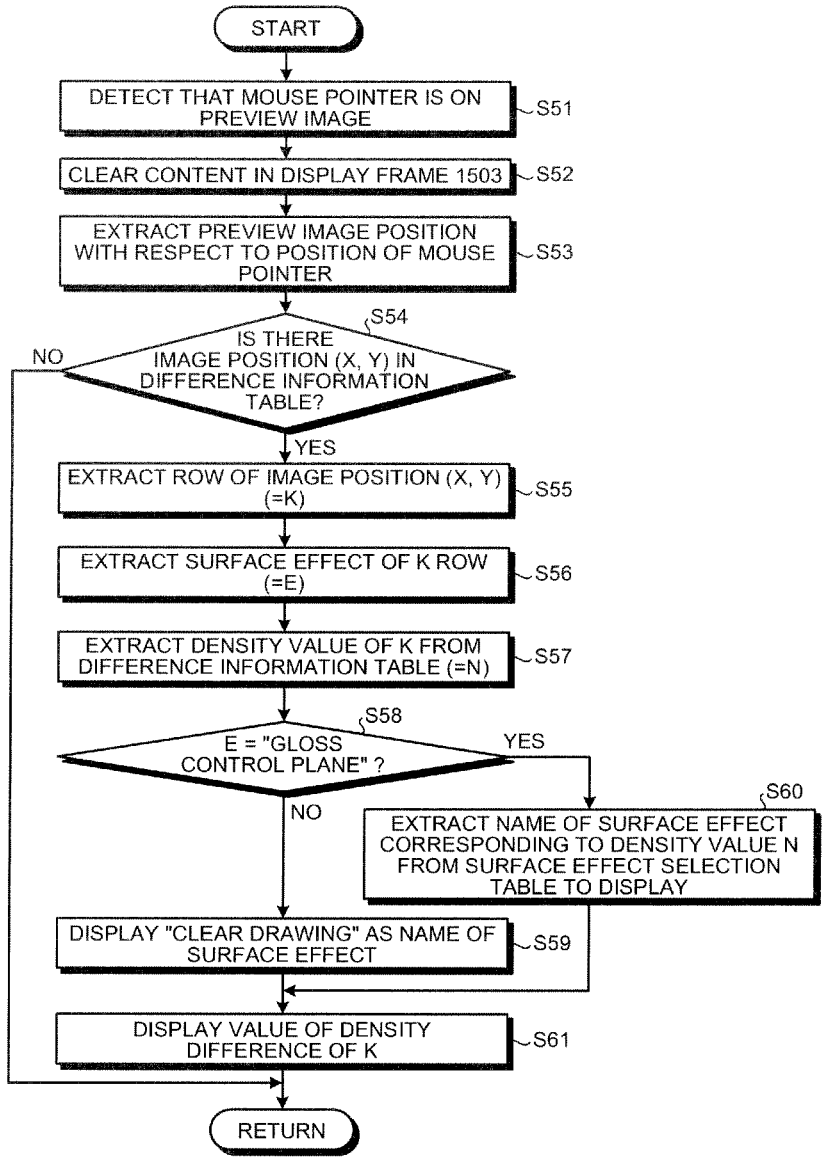
FIG. 24 is a flowchart illustrating a procedure of a detailed display process.

FIG. 24 is a flowchart illustrating a procedure of a detailed display process. When the control unit 503 detects that the mouse pointer is on the preview image (step S51), this clears a content in the display frame 1503 (step S52). Then, the control unit 503 extracts the image position on the preview image with respect to the position of the mouse pointer (step S53).

Then, the control unit 503 checks whether an extracted image position (X, Y) is present in the difference information table (step S54). When the extracted image position (X, Y) is not present in the difference information table (step S54: No), the process is finished.

On the other hand, when the extracted image position (X, Y) is present in the difference information table (step S54: Yes), the record of a row of the image position (X, Y) is extracted and the extracted record is set to K (step S55). Then, the control unit 503 extracts the surface effect of the extracted row K and sets the same to E (step S55).

Then, the control unit 503 extracts the density value of the row K from the difference information table and sets the same to N (step S57). Then, the control unit 503 checks whether E is the "gloss control plane" (step S58). When E is the "gloss control plane" (step S58: Yes), the control unit 503 extracts the name of the surface effect corresponding to the density value N from the surface effect selection table (refer to FIG. 11) and displays the same in the display frame 1503 (step S60).

On the other hand, when E is not the "gloss control plane" at step S58 (step S58: No), the control unit 503 displays "clear drawing" in the display frame 1503 as the name of the surface effect (step S59).

Then, the control unit 503 displays the fact that there is the difference in density and the value of the density difference in the K row in the display frame 1503 (step S61). According to this, detailed information of the inconsistent region is displayed in the display frame 1503.

In this manner, since the DFE 50 of this embodiment compares the clear toner plane data α before the total amount control and the clear toner plane data β after the total amount controlling process, extracts the inconsistent region composed of the pixels in which the difference in the density value is not smaller than the value of the same density range to display, it is possible to allow the user to grasp the portion in which the effect by the clear toner cannot be obtained due to the total amount controlling process of the toner in a pixel level before executing the printing, thereby easily obtaining a printed matter of a desired effect by the clear toner while maintaining the printing quality without an excessive system configuration.

Second Embodiment

Although the DFE 50 performs the comparing process of the clear toner plane data and the preview image generating process in the first embodiment, there is no limitation.

That is to say, it is also possible to configure such that any of a plurality of processes performed by one device is performed by one or more other devices connected to the one device via a network.

As an example, an image forming system of a second embodiment is equipped with a part of functions of a DFE on a server device on the network.

Figure 25:
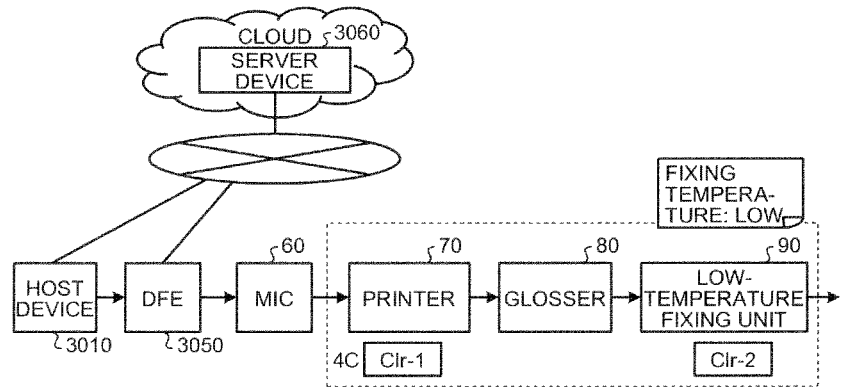
FIG. 25 is a view illustrating a configuration of an image forming system according to a second embodiment.

FIG. 25 is a view illustrating a configuration of the image forming system according to the second embodiment. As illustrated in FIG. 25, the image forming system of this embodiment is provided with a host device 3010, a DFE 3050, a MIC 60, a printer 70, a glosser 80, a low-temperature fixing unit 90, and a server device 3060 on a cloud. Post processing devices such as the glosser 80 and the low-temperature fixing unit 90 are not limited thereto.

In this embodiment, it is configured such that the host device 3010 and the DFE 3050 are connected to the server device 3060 via the network such as the Internet. Also, in this embodiment, it is configured such that the clear toner plane comparing unit, the preview image generating unit, and the setting unit of the DFE 50 of the first embodiment are provided on the server device 3060.

Herein, a function and a configuration of the host device 3010 are similar to those of the host device 10 of the first embodiment. A connecting configuration of the host device 3010, the DFE 3050, the MIC 60, the printer 70, the glosser 80, and the low-temperature fixing unit 90 is similar to that of the first embodiment.

That is to say, specifically, it is configured such that the host device 3010 and the DFE 3050 are connected to a single server device 3060 via the network (cloud) such as the Internet, a clear toner plane comparing unit 2510, a preview image generating unit 2506, and a setting unit 2504 are provided on the server device 3060, and the comparing process of the clear toner plane data before and after a total amount controlling process and the generating process of a preview image are performed by the server device 3060 in the second embodiment.

Figure 26:
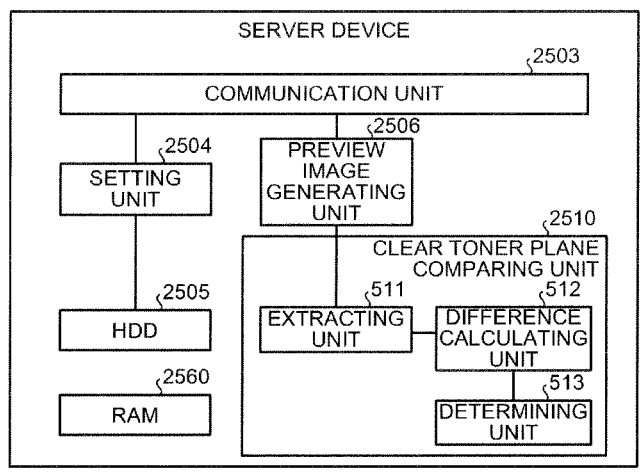
FIG. 26 is a block diagram illustrating a functional configuration of a server device according to the second embodiment.

Next, the server device 3060 is described. FIG. 26 is a block diagram illustrating a functional configuration of the server device 3060 according to the second embodiment. The server device 3060 is principally provided with a communication unit 2503, the setting unit 2504, the preview image generating unit 2506, the clear toner plane comparing unit 2510, a HDD 2505, and a RAM 2560 as illustrated in FIG. 26.

The communication unit 2503 controls transmission and reception of various data with the host device 3010 and the DFE 3050. In this embodiment, the communication unit 2503 receives clear toner plane data α before the total amount controlling process is applied and clear toner plane data β after the total amount controlling process is applied from the DFE 3050. The communication unit 2503 also transmits the preview image generated by the preview image generating unit 2506 to the DFE 3050.

The setting unit 2504 transmits a clear toner plane comparison setting screen to the DFE 3050 through the communication unit 2503 and allows a display device 502 of the DFE 3050 to display the clear toner plane comparison setting screen. The setting unit 504 receives input events of a value of a same density range described above, specification of a color as a display form of an inconsistent region, and the specification of the color as the display form of a consistent region by a user from the clear toner plane comparison setting screen through the communication unit 2503 and sets the value of the same density range, the color specification of the inconsistent region, and the color specification of the consistent region, which are received, by storing them in the HDD 3505. Herein, the clear toner plane comparison setting screen is similar to that of the first embodiment.

The clear toner plane comparing unit 2510 compares the clear toner plane data α before the total amount controlling process is applied and the clear toner plane data β after the total amount controlling process is applied received by the communication unit 2503. The clear toner plane comparing unit 2510 is provided with a determining unit 513, a difference calculating unit 512, and an extracting unit 511 as illustrated in FIG. 26. A function of each unit is similar to that of each unit of the clear toner plane comparing unit 510 of the DFE 50 of the first embodiment.

Figure 27:
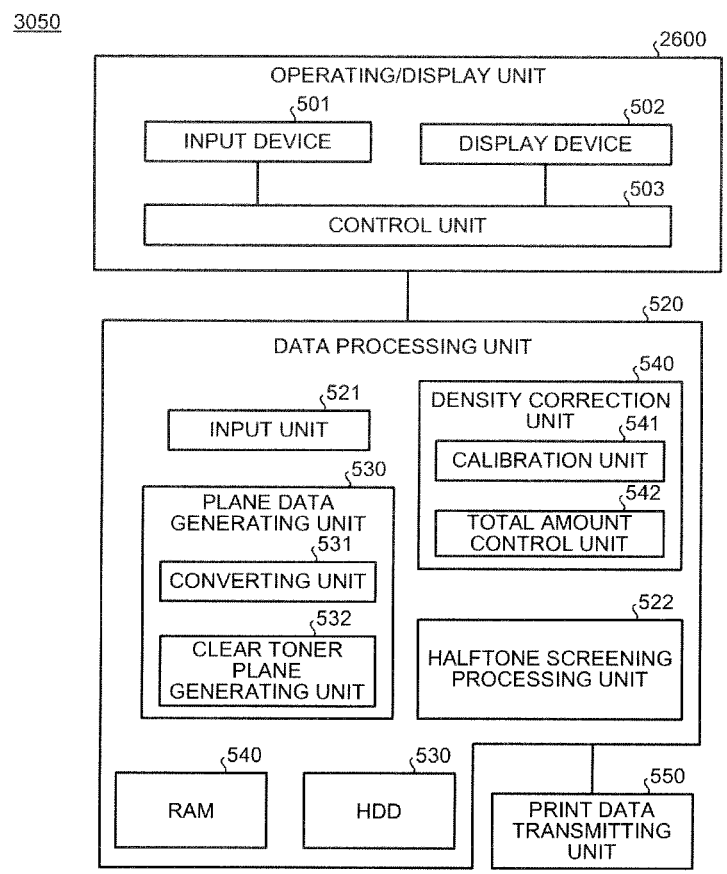
FIG. 27 is a block diagram illustrating a functional configuration of a DFE of the second embodiment.

Next, the DFE 3050 is described. FIG. 27 is a block diagram illustrating a functional configuration of the DFE 3050 of the second embodiment. The DFE 3050 of this embodiment is provided with an operating/display unit 2600, a data processing unit 520, and a print data transmitting unit 550.

The operating/display unit 2600 is provided with an input device 501, the display device 502, and a control unit 503 as illustrated in FIG. 27 and each unit has a function similar to that of each unit of the DFE 50 of the first embodiment. In other words, the operating/display unit 2600 of this embodiment has a configuration obtained by removing the preview image generating unit, the clear toner plane comparing unit, the setting unit, the HDD, and the RAM from the operating/display unit 500 of the first embodiment.

The data processing unit 520 has a function and a configuration similar to those of the data processing unit 520 of the DFE 50 of the first embodiment. The print data transmitting unit 550 also has a function and a configuration similar to those of the print data transmitting unit 550 of the DFE 50 of the first embodiment.

Next, a clear toner plane generating process by the image forming system according to this embodiment configured in the above-described manner is described. In this embodiment, as in the first embodiment, print data is generated by the host device 3010 and the print data is transmitted to the DFE 3050. Then, in the DFE 3050, as in the first embodiment, the print data is received and processes at steps S1 to S10 illustrated in FIG. 17 are performed, and according to this, the clear toner plane data is generated, the total amount controlling process is applied to the clear toner plane data, and image data obtained by integrating color plane data and the clear toner plane data is generated to be output to the MIC 60.

Herein, a case in which the user issues an instruction of preview display at step S8 is described. At step S8, when the user selects "preview" in a menu screen (step S8: preview), the DFE 3050 transmits the clear toner plane data α before the total amount controlling process is applied and the clear toner plane data β after the total amount controlling process is applied to the server device 3060.

Figure 28:
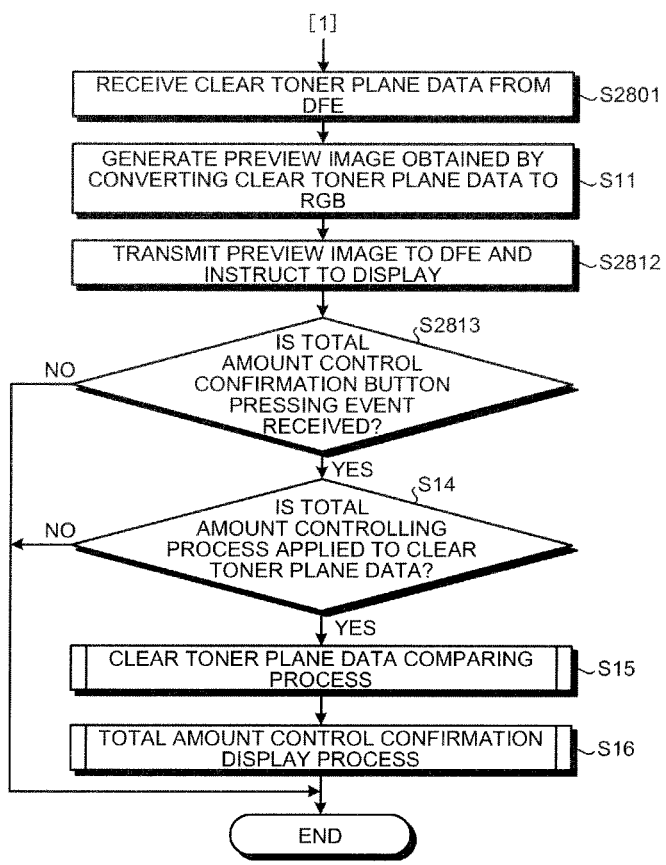
FIG. 28 is a flowchart illustrating a procedure of a display process of a preview image by the server device of the second embodiment.

FIG. 28 is a flowchart illustrating a procedure of a display process of the preview image by the server device 3060 of the second embodiment. In FIG. 28, the procedure of the process at a server device 3060 when the user issues the instruction of the preview display at step S8 in FIG. 17 is illustrated.

The communication unit 2503 of the server device 3060 receives the clear toner plane data α before the total amount controlling process is applied and the clear toner plane data β after the total amount controlling process is applied from the DFE 3050 (step S2801). Then, the preview image generating unit 2506 generates the preview image obtained by converting the clear toner plane data to RGB (step S11). Then, the communication unit 2503 transmits the generated preview image to the DFE 3050 and issues the instruction to display (step S2812). According to this, the preview image is displayed on the display device 502 of the DFE 3050.

Herein, a displayed preview screen before printing is similar to that in an example of the first embodiment illustrated in FIG. 19.

When the preview screen is displayed by the DFE 3050, the communication unit 2503 determines whether a pressing event of a total amount control confirmation button 1402 in the preview screen is received from the DFE 3050 (step S2813). When the total amount control confirmation button 1402 is not pressed while a certain period of time (step S2813: No), the process is finished.

On the other hand, when the pressing event of the total amount control confirmation button 1402 is received (step S2813: Yes), the determining unit 513 determines whether the total amount controlling process is applied to the clear toner plane data (step S14). Specifically, the determining unit 513 determines whether the total amount controlling process is applied by a sum of density values of the clear toner plane data. When it is determined that the total amount controlling process is not applied to the clear toner plane data (step S14: No), the process is finished.

On the other hand, when it is determined that the total amount controlling process is applied to the clear toner plane data (step S14: Yes), the clear toner plane comparing unit 510 performs the comparing process of the clear toner plane data α before the total amount controlling process and the clear toner plane data β after the total amount controlling process (step S15). Herein, the comparing process of the clear toner plane is performed as in the comparing process of the clear toner plane of the first embodiment described with reference to FIG. 20.

Thereafter, the server device 3060 performs a total amount control confirmation display process (step S16) and finishes the process.

Figure 29:
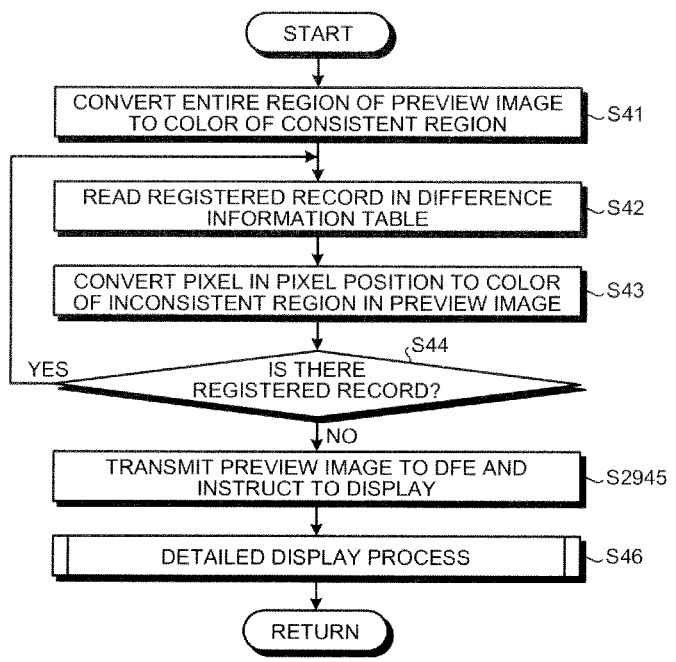
FIG. 29 is a flowchart illustrating a procedure of a total amount control confirmation display process.

Next, the total amount control confirmation display process at step S16 is described in detail. FIG. 29 is a flowchart illustrating a procedure of the total amount control confirmation display process. Processes at S41 to S44 are performed as in the total amount control confirmation display process by the DFE 50 of the first embodiment (FIG. 22).

When the processes at steps S42 and S43 are completed for all records registered in a difference information table (step S44: No), the communication unit 2503 transmits the preview image in which the inconsistent region and the consistent region are converted to respective display colors to the DFE 3050 and issues the instruction to display (step S2945). According to this, the preview image in which total amount control confirmation display is performed is displayed on the display device 502 of the DFE 3050. Herein, an example of the preview screen in which the preview image in which the total amount control confirmation display is performed is displayed is similar to the screen of the first embodiment illustrated in FIG. 23.

When the user instructs (hovers a mouse over) the inconsistent region by a mouse pointer of the input device 501 in the preview screen, the communication unit 2503 receives the event and performs detailed display of the inconsistent region in a display frame 1503 (step S46).

Figure 30:
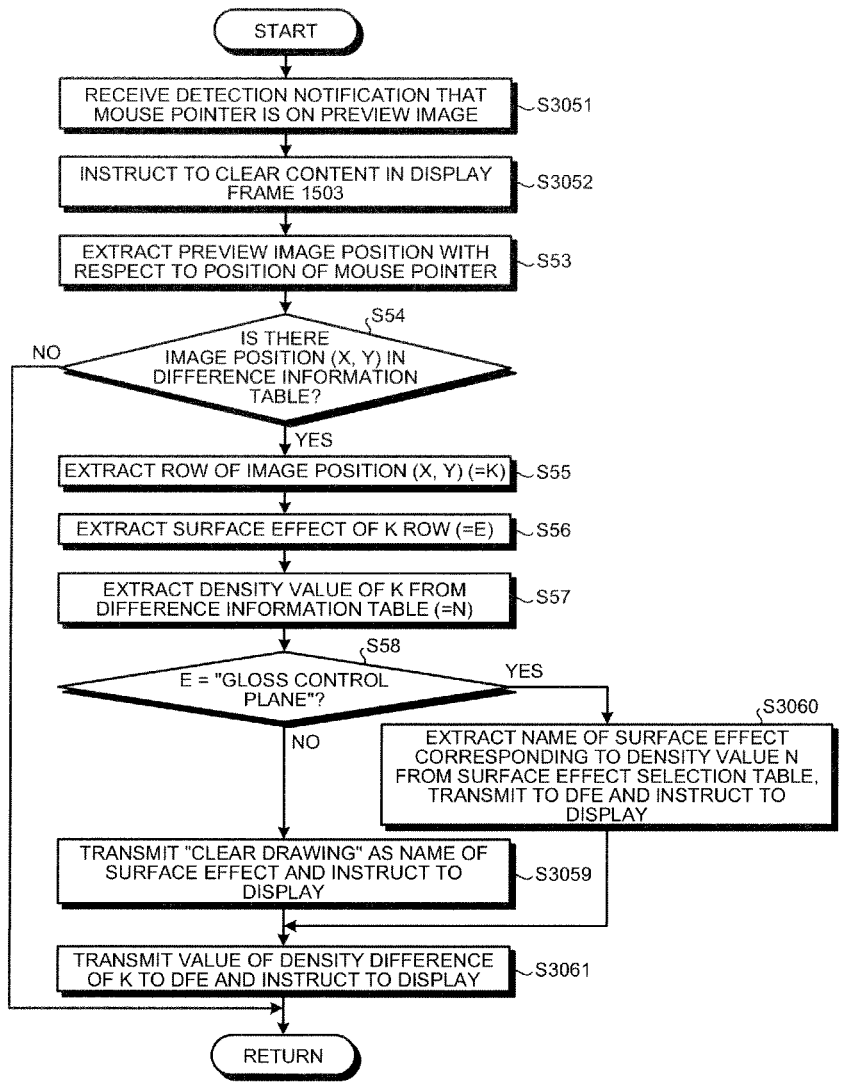
FIG. 30 is a flowchart illustrating a procedure of a detailed display process by the server device of the second embodiment.

FIG. 30 is a flowchart illustrating a procedure of a detailed display process by the server device 3060 of the second embodiment. When the communication unit 2503 receives detection notification indicating that the mouse pointer is on the preview image from the DFE 3050 (step S3051), this transmits an instruction to clear a content of the display frame 1503 to the DFE 3050 (step S3052). According to this, the content in the display frame 1503 of the preview screen is cleared in the display device 502 of the DFE 3050. Then, the communication unit 2503 extracts an image position on the preview image with respect to a position of the mouse pointer (step S53). Subsequent processes at steps S54 to S58 are performed as in the detailed display process executed by the DFE 50 of the first embodiment (FIG. 24).

When E is a "gloss control plane" at step S58 (step S58: Yes), the control unit 503 extracts a name of a surface effect corresponding to a density value N from a surface effect selection table (refer to FIG. 11) and transmits the same to the DFE 3050 to issue the display instruction (step S3060). According to this, the name of the surface effect is displayed in the display frame 1503 of the preview screen in the display device 502 of the DFE 3050.

On the other hand, when E is not the "gloss control plane" at step S58 (step S58: No), the communication unit 2503 transmits "clear drawing" as the name of the surface effect to the DFE 3050 and issues the display instruction (step S3059). According to this, in the display device 502 of the DFE 3050, the "clear drawing" is displayed as the name of the surface effect in the display frame 1503 of the preview screen.

Then, the communication unit 2503 transmits the fact that there is a difference in the density and a value of the density difference in a K row to the DFE 3050 and issues the display instruction (step S3060). According to this, in the display device 502 of the DFE 3050, the detailed information of the inconsistent region is displayed in the display frame 1503.

Subsequent processes in the DFE 3050, the MIC 60, the printer 70, the glosser 80, and the low-temperature fixing unit 90 are performed as in the first embodiment.

In this manner, the comparing process of the clear toner plane data and the preview image generating process are performed by the server device 3060 on the cloud in this embodiment, so that, in addition to the effect of the first embodiment, it is possible to collectively perform the comparing process of the clear toner plane data and the preview image generating process even when there are a plurality of DFEs 3050 and this is convenient for the user and an administrator.

Meanwhile, although it is configured such that the setting unit 2504, the preview image generating unit 2506, and the clear toner plane comparing unit 2510 are provided on the single server device 3060 on the cloud and the comparing process of the clear toner plane data and the generating process of the preview image are performed at a server device 3060 in this embodiment, there is no limitation.

Figure 31:
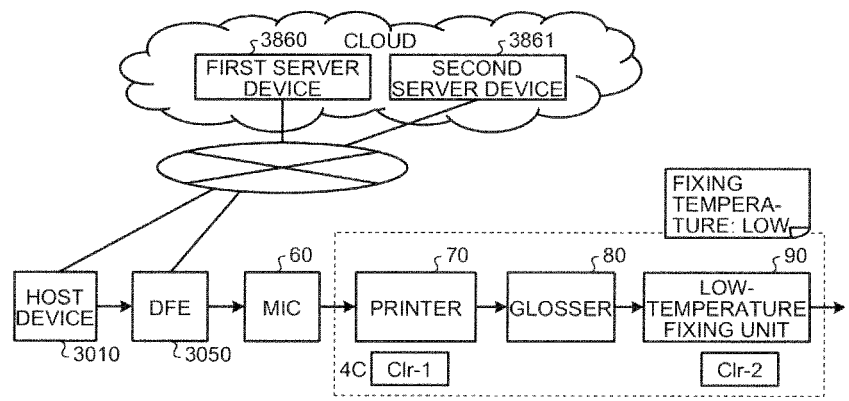
FIG. 31 is a network configuration diagram in which two servers are provided on a cloud.

For example, it is also possible to configure such that two or more server devices are provided on the cloud and the above-described processes are distributed to the two or more server devices to be executed. FIG. 31 is a network configuration diagram in which two servers (a first server device 3860 and a second server device 3861) are provided on the cloud. In an example in FIG. 31, it is configured such that the comparing process of the clear toner plane data and the generating process of the preview image are distributed to the first server device 3860 and the second server device 3861 to be performed. For example, it is possible to configure such that the first server device 3860 is provided with the clear toner plane comparing unit to perform the comparing process of the clear toner plane data and the second server device 3861 is provided with the preview image generating unit to perform the generating process of the preview image. Meanwhile, a mode of distributing the processes to the server devices is not limited thereto and this may be optionally performed.

That is to say, it is possible to optionally collectively provide a part or all of the units composing the setting unit 2504, the preview image generating unit 2506, the clear toner plane comparing unit 2510, and the data processing unit 520 on one server device on the cloud or distribute them on a plurality of server device as long as if a minimum configuration such as the input device 501 and the display device 502 is provided on the DFE 3050.

In other words, it is possible to configure such that any of a plurality of processes performed by the one device is performed by one or more other devices connected to the one device via the network as in the above-described example.

Also, in the above-described case of the "configuration to perform by one or more other devices connected to the one device via the network", it is configured to include an input/output process of the data performed between the one device and the other device and further between the other devices such as a process to output the data (information) generated by the process performed by the one device from the one device to the other device and a process to input the data by the other device.

That is to say, when the number of other device is one, it is configured to include the input/output process of the data performed between the one device and the other device, and when the number of other devices is two or larger, it is configured to include the input/output process of the data between the one device and the other device and between the other devices such as between a first other device and a second other device.

Although the server device 3060 or a plurality of server devices such as the first server device 3860 and the second server device 3861 are provided on the cloud in the second embodiment, the server device is not limited thereto. For example, it is also possible to configure such that the server device 3060 or a plurality of server devices such as the first server device 3860 and the second server device 3861 are provided on any network such as an intranet.

Figure 32:
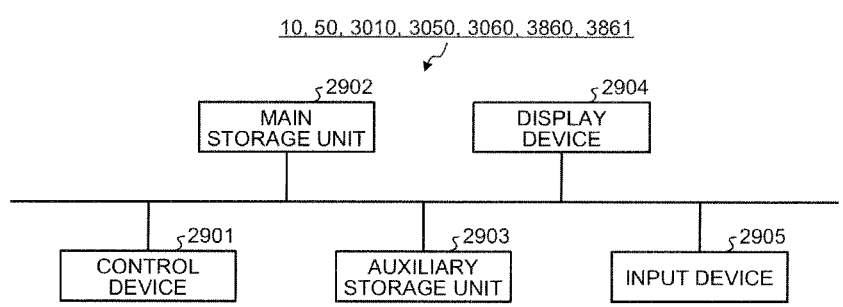
FIG. 32 is a hardware configuration diagram of a host device, the DFE, and the server device.

A hardware configuration of the host devices 10 and 3010, the DFEs 50 and 3050, the server device 3060, the first server device 3860, and the second server device 3861 of the above-described embodiments is described. FIG. 32 is a hardware configuration diagram of the host devices 10 and 3010, the DFEs 50 and 3050, and the server device 3060. The host devices 10 and 3010, the DFEs 50 and 3050, the server device 3060, the first server device 3860, and the second server device 3861 are principally provided with a control device

2901 such as a CPU to control an entire device, a main storage unit 2902 such as a ROM and a RAM to store various data and various programs, an auxiliary storage unit 2903 such as a HDD to store the various data and the various programs, an input device 2905 such as a keyboard and a mouse, and a display device 2904 such as a display device as the hardware configuration, and has the hardware configuration using a regular computer.

Various processing programs (including an image processing application, the same shall apply hereinafter) executed by the host devices 10 and 3010 of the above-described embodiments are recorded in a computer-readable recording medium such as a CD-ROM, a flexible disk (FD), a CD-R, a DVD (Digital Versatile Disk) as a file in an installable format or an executable format to be provided as a computer program product.

It is also possible to configure to store the various processing programs executed by the host devices 10 and 3010 of the above-described embodiments on the computer connected to the network such as the Internet and download the same via the network to provide. It is also possible to configure to provide or distribute the various processing programs executed by the host device 10 of the above-described embodiment via the network such as the Internet.

It is also possible to configure to incorporate the various processing programs executed by the host devices 10 and 3010 of the above-described embodiments in advance in the ROM and the like to provide.

The various processing programs executed by the host devices 10 and 3010 of the above-described embodiments have a module configuration including each processing unit, and as actual hardware, the CPU (processor) reads the various processing programs from the above-described storage medium to execute, thereby loading each processing unit on the main storage unit to generate on the main storage unit.

Also, the various processes executed by the DFEs 50 and 3050 of the above-described embodiments may be realized by the various processing programs as software in addition to be realized by the hardware. In this case, the various processing programs executed by the DFEs 50 and 3050 of the above-described embodiments are incorporated in advance in the ROM and the like to be provided.

It is also possible to configure such that the various processing programs executed by the DFEs 50 and 3050 of the above-described embodiments are recorded in the computer-readable recording medium such as the CD-ROM, the flexible disk (FD), the CD-R, the DVD (Digital Versatile Disk) as the file in the installable format or the executable format to be provided as the computer program product.

Further, it is also possible to configure to store the various processing programs executed by the DFEs 50 and 3050 of the above-described embodiments on the computer connected to the network such as the Internet and download them via the network to provide. It is also possible to configure to provide or distribute the various processing programs executed by the DFE 50 of the above-described embodiment via the network such as the Internet.

The various processing programs executed by the DFEs 50 and 3050 of the above-described embodiments have the module configuration including each unit described above, and as the actual hardware, the CPU (processor) reads a print control program from the ROM to execute, thereby loading each unit described above on the main storage unit to generate on the main storage unit.

Also, the various processes executed by the server device 3060 of the above-described embodiment may be realized by the various processing programs as software in addition to be realized by the hardware. In this case, the various processing programs executed by the server device 3060 of the above-described embodiment are incorporated in advance in the ROM and the like to be provided.

It is possible to configure such that the various processing programs executed by the server device 3060 of the above-described embodiment is recorded in the computer-readable recording medium such as the CD-ROM, the flexible disk (FD), the CD-R, the DVD (Digital Versatile Disk) as the file in the installable format or the executable format to be provided as the computer program product.

Further, it is also possible to configure to store the various processing programs executed by the server device 3060 of the above-described embodiment on the computer connected to the network such as the Internet and download them via the network to provide. It is also possible to configure to provide or distribute the various processing programs executed by the server device 3060 of the above-described embodiment via the network such as the Internet.

The various processing programs executed by the above-described server device 3060 have the module configuration including each unit described above, and as the actual hardware, the CPU (processor) reads a generating program from the above-described ROM to execute, thereby loading each unit described above on the main storage unit to generate on the main storage unit.

Meanwhile, the present invention is not limited to the above-described embodiments; components may be modified to be embodied without departing from the spirits thereof in an implementation phase. Also, various inventions may be made by appropriate combination of a plurality of components disclosed in the embodiments. For example, some components may be deleted from all the components described in the embodiments. Further, it is also possible to appropriately combine the components in different embodiments. Also, various modifications as illustrated hereinafter are available.

Although the image forming system is configured to be provided with the host devices 10 and 3010, the DFEs 50 and 3050, the MIC 60, the printer 70, the glosser 80, and the low-temperature fixing unit 90 in the above-described embodiments, there is no limitation. For example, it is also possible to integrally form the DFEs 50 and 3050, the MIC 60, and the printer 70 into one image forming device and to form as the image forming device further provided with the glosser 80 and the low-temperature fixing unit 90.

Although the image forming system of the above-described embodiments forms the image by using toners of a plurality of colors of CMYK, it is also possible to form the image by using the toner of one color.

Meanwhile, although a printer system of the above-described embodiments is provided with the MIC 60, the printer system is not limited thereto. It is also possible to configure such that another device such as the DFE 50 is provided with the process and the function performed by the above-described MIC 60 and the MIC 60 is not provided.

Meanwhile, the present invention is not limited to the above-described embodiments; the components may be modified to be embodied without departing from the spirits thereof in the implementation phase. Also, the various inventions may be made by the appropriate combination of a plurality of components disclosed in the embodiments. For example, some components may be deleted from all the components described in the embodiments. Further, it is also possible to appropriately combine the components in different embodiments. Also, various modifications as illustrated hereinafter are available.

Although the image forming system is configured to be provided with the host device 10, the DFE 50, the MIC 60, the printer 70, the glosser 80, and the low-temperature fixing unit 90 in the above-described embodiment, the image forming system is not limited thereto. For example, it is also possible to integrally form the DFE 50, the MIC 60, and the printer 70 into one image forming device and to form as the image forming device further provided with the glosser 80 and the low-temperature fixing unit 90.

Although the image forming system of the above-described embodiments forms the image by using the toners of a plurality of colors of CMYK, it is also possible to form the image by using the toner of one color.

Meanwhile, although the printer system of the above-described embodiments is provided with the MIC 60, the printer system is not limited thereto. It is also possible to configure such that another device such as the DFE 50 is provided with the process and the function performed by the above-described MIC 60 and the MIC 60 is not provided.

Although it is configured such that the DFE 50 performs the display process of the preview image in this embodiment, there is no limitation and it is also possible to configure to realize the display process of the preview image by the image system composed of a plurality of devices.

The embodiment has the effect of allowing the user to grasp the portion in which the effect by the clear toner cannot be obtained due to the total amount controlling process of the toner in the pixel level before the printing is executed, thereby easily obtaining the printed matter with the desired effect by the clear toner while maintaining the printing quality without the excessive system configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to a printing device that is equipped with a colored color toner and a colorless clear toner and forms an image on a recording medium based on color plane data to attach the color toner and clear toner plane data to attach the clear toner, the information processing apparatus comprising:
   a total amount control unit that corrects the color plane data and the clear toner plane data so as to apply a total amount controlling process in which a sum of density values of all pixels composing the color plane data and the clear toner plane data becomes not larger than a certain value in a predetermined case;
   a determining unit that determines whether the total amount controlling process is applied to the clear toner plane data;
   a difference calculating unit that calculates a difference between the density value of a pixel of the clear toner plane data and the density value of the pixel of the clear toner plane data to which the total amount controlling process is applied, for each pixel, when the total amount controlling process is applied to the clear toner plane data;
   an extracting unit that extracts an inconsistent region composed of a pixel in which the difference is not smaller than a predetermined threshold; and
   an output unit that outputs the inconsistent region.

2. The information processing apparatus according to claim 1, wherein the difference calculating unit calculates a difference between the density value of the surface effect of a pixel of the clear toner plane data and the density value of the surface effect of the pixel of the clear toner plane data to which the total amount controlling process is applied, for each pixel.

3. The information processing apparatus according to claim 1, wherein the difference calculating unit calculates a difference between the density value of a pixel of the transparent image of the clear toner plane data and the density value of the pixel of the transparent image of the clear toner plane data to which the total amount controlling process is applied, for each pixel.

4. The information processing apparatus according to claim 1, wherein the output unit outputs the inconsistent region in an output form different from a form of a consistent region which is a region other than the inconsistent region.

5. The information processing apparatus according to claim 4, further comprising
   a setting unit that accepts specification of the threshold and the output form of the inconsistent region from a user, wherein
   the output unit outputs the inconsistent region in the specified output form.

6. The information processing apparatus according to claim 5, wherein the output form is a specified color.

7. The information processing apparatus according to claim 1, further comprising
   a display unit; and
   a preview image generating unit that generates a preview image, which is an image obtained by estimating a print result, based on the clear toner plane data to which the total amount controlling process is applied, wherein
   the display unit displays the preview image and displays the inconsistent region on the preview image.

8. The information processing apparatus according to claim 7, further comprising
   an input unit that accepts an operation input from a user on the preview image displayed on the display unit, wherein
   the display unit further displays the surface effect in the inconsistent region and the difference value when a position of the operation input is included in the inconsistent region.

9. An information processing system connected to a printing device that is equipped with a colored color toner and a colorless clear toner and forms an image on a recording medium based on color plane data to attach the color toner and clear toner plane data to attach the clear toner, the information processing system comprising:
   a total amount control unit that corrects the color plane data and the clear toner plane data so as to apply a total amount controlling process in which a sum of density values of all pixels composing the color plane data and the clear toner plane data becomes not larger than a certain value in a predetermined case;
   a determining unit that determines whether the total amount controlling process is applied to the clear toner plane data;
   a difference calculating unit that calculates a difference between the density value of a pixel of the clear toner plane data and the density value of the pixel of the clear toner plane data to which the total amount controlling process is applied, for each pixel, when the total amount controlling process is applied to the clear toner plane data;
   an extracting unit that extracts an inconsistent region composed of a pixel in which the difference is not smaller than a predetermined threshold; and
   an output unit that outputs the inconsistent region.

10. A display method executed by an information processing system connected to a printing device that is equipped with a colored color toner and a colorless clear toner and forms an image on a recording medium based on color plane data to attach the color toner and clear toner plane data to attach the clear toner, the display method comprising:
- a total amount controlling step of correcting the color plane data and the clear toner plane data so as to apply a total amount controlling process in which a sum of density values of all pixels composing the color plane data and the clear toner plane data becomes not larger than a certain value in a predetermined case;
- a determining step of determining whether the total amount controlling process is applied to the clear toner plane data;
- a difference calculating step of calculating a difference between the density value of a pixel of the clear toner plane data and the density value of the pixel of the clear toner plane data to which the total amount controlling process is applied, for each pixel, when the total amount controlling process is applied to the clear toner plane data;
- an extracting step of extracting an inconsistent region composed of a pixel in which the difference is not smaller than a predetermined value; and
- an outputting step of outputting the inconsistent region.

* * * * *